(12) United States Patent
Baker

(10) Patent No.: US 7,224,382 B2
(45) Date of Patent: May 29, 2007

(54) IMMERSIVE IMAGING SYSTEM

(75) Inventor: Robert G. Baker, Boynton Beach, FL (US)

(73) Assignee: Image Masters, Inc., Boynton Beach, FL (US)

( * ) Notice: Subject to any disclaimer, the term of this patent is extended or adjusted under 35 U.S.C. 154(b) by 849 days.

(21) Appl. No.: 10/409,354

(22) Filed: Apr. 8, 2003

(65) Prior Publication Data
US 2004/0027451 A1    Feb. 12, 2004

Related U.S. Application Data

(60) Provisional application No. 60/371,805, filed on Apr. 12, 2002.

(51) Int. Cl.
H04N 15/00 (2006.01)
H04N 13/04 (2006.01)

(52) U.S. Cl. ...................................................... 348/46

(58) Field of Classification Search ................ 348/46, 348/51, 36, 38, 39, 37, 144, 208, 42, 47; 382/284, 294, 293, 318, 103, 106, 107, 153, 382/238, 251, 252; 359/838, 862, 863
See application file for complete search history.

(56) References Cited

U.S. PATENT DOCUMENTS

| | | |
|---|---|---|
| 4,418,993 A | 12/1983 | Lipton |
| 4,499,490 A | 2/1985 | Morgan |
| 4,566,763 A | 1/1986 | Greguss |
| 4,879,596 A | 11/1989 | Miura et al. |
| 5,473,474 A | 12/1995 | Powell |
| 5,657,073 A | 8/1997 | Henley |
| 5,703,961 A | 12/1997 | Rogina et al. |
| 5,727,239 A | 3/1998 | Hankawa et al. |
| 5,745,305 A | 4/1998 | Nalwa |
| 5,790,181 A | 8/1998 | Chahl et al. |
| 5,790,182 A | 8/1998 | St. Hilaire |
| 5,845,713 A | 12/1998 | Sundholm |
| 5,920,376 A | 7/1999 | Bruckstein et al. |
| 5,990,934 A * | 11/1999 | Nalwa .......................... 348/36 |
| 6,003,998 A | 12/1999 | St. Hilaire |

* cited by examiner

*Primary Examiner*—Tung Vo
*Assistant Examiner*—Behrooz Senfi
(74) *Attorney, Agent, or Firm*—Jon A. Gibbons; Fleit Kain Gibbons Gutman Bongini & Bianco P.L.

(57) ABSTRACT

A system, method and device for the capture and display of high-resolution stereoscopic or monoscopic wide fields-of-view (FOV) at still or video rates, presenting techniques and designs for distance measuring, for changing the working stereo capture range of a stereoscopic image capture device, and for playing pre-recorded or transmitted stereoscopic video image data through a player unit. The system supports multiple independent viewers and image analysis sub-systems of various types utilizing hardware, software and firmware. Further included is a stereoscopic videoconferencing embodiment that captures and transmits an entire room's view and automatically directs focus of images.

10 Claims, 15 Drawing Sheets

4-pair Camera Head

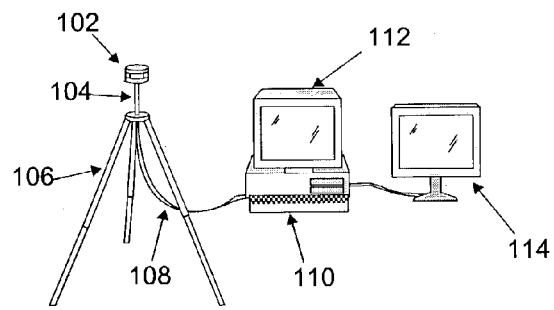
One Embodiment of Stereoscopic Immersive Imaging System
Figure 1
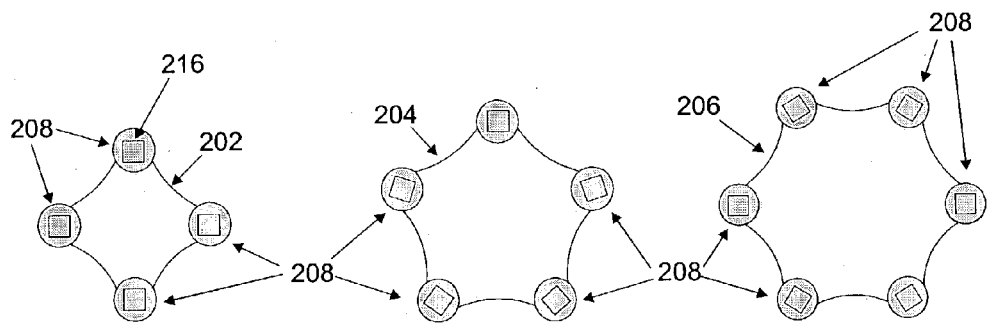
| 4-pair Camera Design | 5-pair Camera Design | 6-pair Camera Design |
|---|---|---|
| Figure 2a | Figure 2b | Figure 2c |
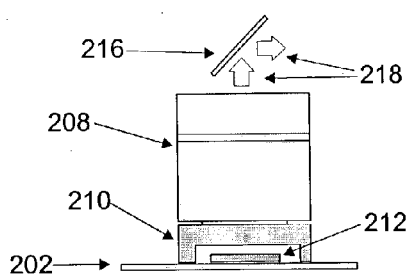 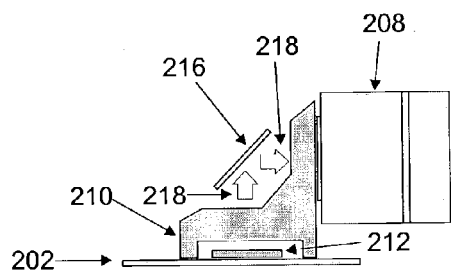
Optical Path Method 1　　　　　Optical Path Method 2
Figure 2d　　　　　　　　　　Figure 2e

4-pair Camera Head

Prior Art
Fish-eye Lens Projection

Prior Art
Catadioptric Projection

Prior Art
Pyramidal Projection

Present Invention
Rectangular Projection

Coverage for Left-eye Image Data Set

Coverage for Right-eye Image Data Set

Standard Stereo View Creation

Opposite Stereo View Creation

Interpolated Stereo View Creation

Off-axis Interpolated Effects

Standard Capture Process in Camera Head

Panoramic Control Display Process

Stereoscopic Display Process

Standard Ray Tracing

Ray Projection onto Imager

Triangulation Method

Triangulation Process

Stereoscopic Panoramic Imaging System Functional Block Diagram

Example Analysis Module Functional Block Diagram

Monoscopic Camera Head 4-imager Monoscopic FOV

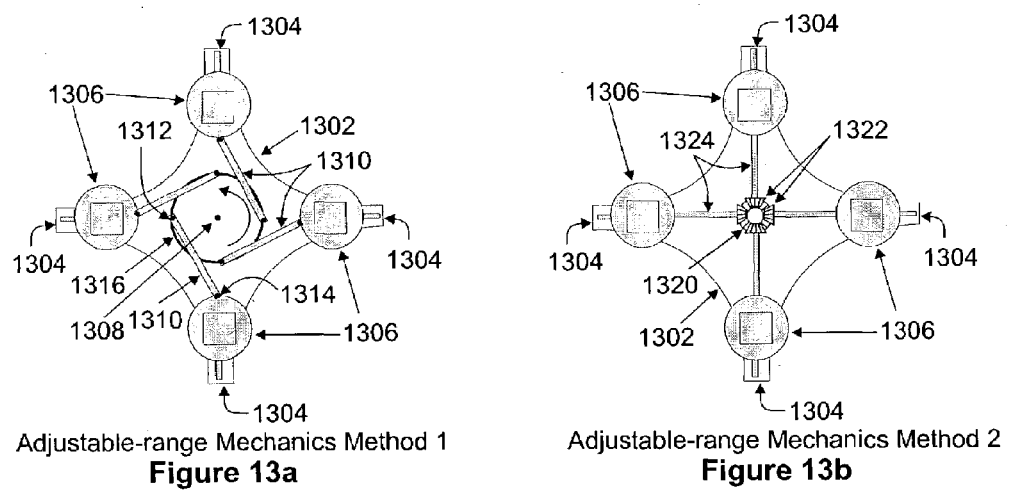
Adjustable-range Mechanics Method 1
Figure 13a
Adjustable-range Mechanics Method 2
Figure 13b
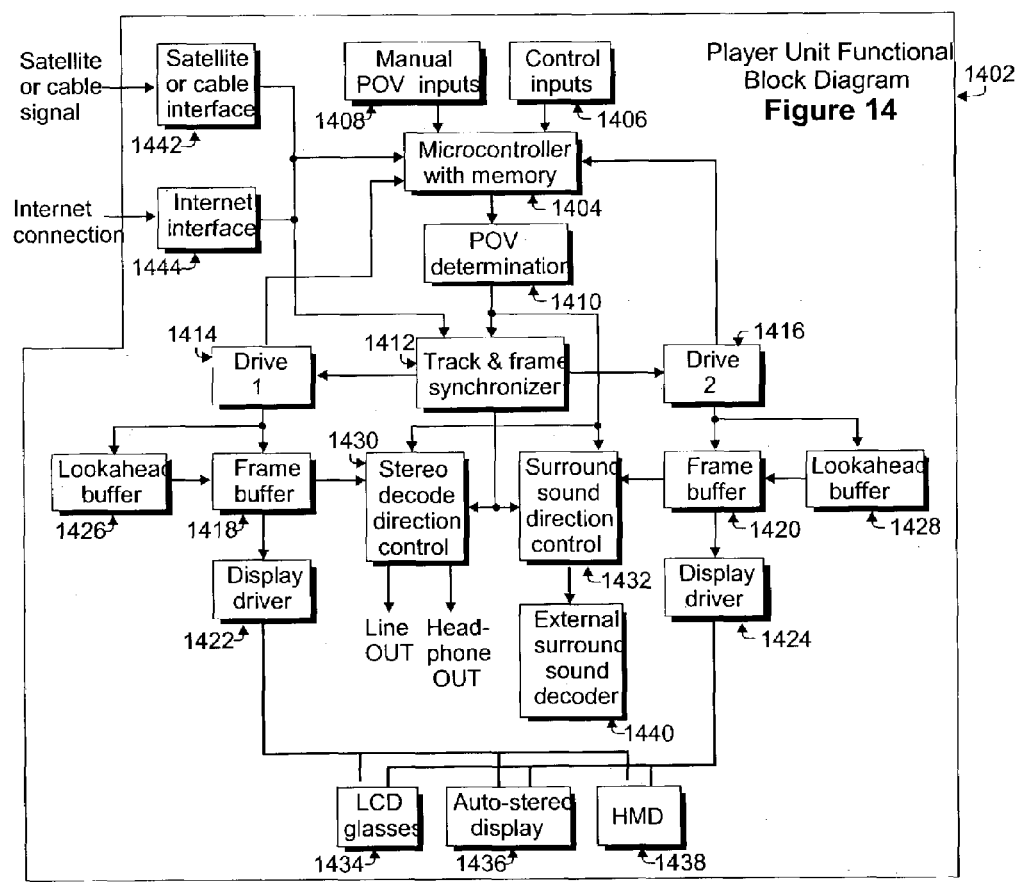
Player Unit Functional Block Diagram
Figure 14

Videoconferencing System Drawing

Videoconferencing System Functional Block Diagram

**Mirror Assembly

**Mirror Assembly Optical Paths

**Inter-pixel Alignment

Computer System 1700

Embedded Movie Streams Process

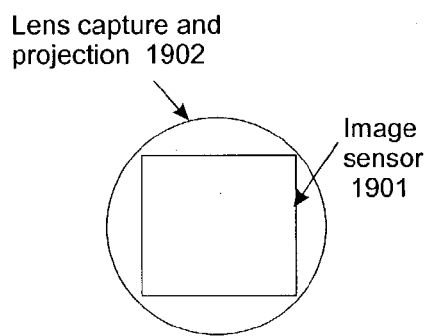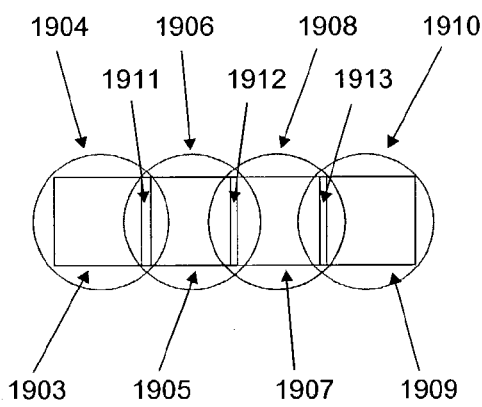
Lens capture and projection 1902
Image sensor 1901
Image Projection
Figure 19a
Overlapping Image Capture
Figure 19b

IMMERSIVE IMAGING SYSTEM

CROSS-REFERENCED APPLICATIONS

The present non-provisional application claims priority to provisional patent application Ser. No. 60/371,805 with inventor Robert G. Baker, entitled "Immersive Imaging System" filed Apr. 12, 2002, which is hereby incorporated by reference in its entirety.

FIELD OF THE INVENTION

The present invention is an imaging system that provides stereoscopic or monoscopic video acquisition, recording, playing back and transmitting the image data. Various embodiments provide adjustable stereoscopic capture ranges, analyses of image information, measurement of object distances in fields of view, and videoconferencing for 360° fields-of-view.

BACKGROUND OF THE INVENTION

Definitions:

The following non-limiting definitions are used to aid the reader with this patent application.

Autostereoscopic: A self-contained stereoscopic display device that supplies different views to the two eyes of a viewer without requiring additional external optical or electronic display devices.

Capture board: A printed circuit board that houses the imaging sub-system and optical components within the camera head.

Catadioptric: Pertaining to, produced by, or involving, both the reflection and refraction of light; with regard to lenses, this is a long lens that uses mirrors within its construction, allowing an extremely long focal length lens to fit within a relatively short barrel. Also known as reflex or mirror lens.

Extrapupillary: Outside of the pupils of two eyes; When used with "separation distances", this is a distance greater than the distance between the centers of the pupils for a given individual. An average interpupillary distance is around 2.5 inches, so extrapupillary separation distances would exceed that.

Fail-soft: The operational characteristic of a system in which failures of one or more components cause a degradation in performance but not total inoperability of all functions.

Far-field: Visual areas far away from a camera; subjectively determined.

Gen-lock: The process of synchronizing more than one video frame to start at the same time.

HMD: Head-mounted display; a display device worn on the head and used to present separate or identical electronic images to each eye.

Hyper-stereo/hyper-stereoscopic: Still or video images that are produced using cameras separated by a distance larger than the normal separation distance of human eyes, about 2.5 inches.

Imager: An electronic light-gathering device, such as a charge-coupled device (CCD), charge-injection device (CID), or CMOS visual sensor device used for capturing images; may be in the form of a strip or an array of light-gathering picture elements (pixels). The "pixel density" of an imager is the amount of light-gathering elements in a given unit area.

Immersive imaging: The capture, display and/or manipulation of images that give a sense to the viewer of being surrounded by the images ("immersed" in them).

Interocular: Between two optical components. When used with "separation distances", this is the distance between two optical systems used to create stereoscopic images.

Interpolation: The determination of intermediate values between known existing values. Interpolation refers to the determination of image data values at pixel locations between other pixel locations using known data from existing pixels locations. An "interpolator" or "interpolation processor" is a device, set of processes, circuits, or other means for calculating interpolation values.

Interpupillary: Between the pupils of two eyes. When used with "separation distances", this is the distance between the centers of the pupils for a given individual. Normally for humans, this distance averages around 2.5 inches.

Monoscopic: Representations providing only a single visual perspective for each point in the field-of-view, as might be seen using just a single eye or captured using just a single imaging sub-system.

Near-field: Visual areas within a few feet of a camera; subjectively determined.

Normalize: A process or procedure by which non-standard values are brought back to standard value ranges; in the context of intrapupillary and extrapupillary separation distances, normalizing implies correcting images captured at extrapupillary separation distances to make them appear as if captured at average interpupillary separation distances.

Optical plane: The plane in and about which light rays may be captured and viewed; relates to the plane in which a plurality of optical components and image sensing devices may be physically located; images derived from components not on the same optical plane would require manipulation of the images to correct for changing tilt angles.

Panoramic: A wide field-of-view that encompasses 360° in the horizontal plane (the horizon in all directions) and a limited number of degrees less than 180° in the vertical plane; does not usually include image data from directly over and under the image capture device.

Panospheric/Spherical: A wide field-of-view that encompasses all of the visual field around an image capture device; in most practical devices, this excludes the area under the support structure of that device.

Stereopsis: The perception of stereoscopic viewing effects induced by the presentation of slightly different views to a viewer's two eyes. The "effective stereo viewing range" is that distance from a two-eyed viewer or stereoscopic camera in which stereopsis is readily perceived by individuals with normal viewing capabilities.

Telepresence: The presentation of remotely-acquired image and audio information in such a way as to give the person experiencing the information a sense of presence at the remote location.

Triangulation: A method for determining the location of objects in two- or three-dimensional space through trigonometric calculations using information from a plurality of sensors who locations in relationship to each other is known.

Immersive imaging is defined as still or video images that provide a realistic or pseudo-realistic visual representation of an environment in such a way that the person viewing the images feels "immersed" in them (fully surrounded, as when immersed in water). With improvements in digital imaging components and processing speeds, there is increasing interest in immersive imaging because electronic and computer technologies can now practically support it. These immersive images are sometimes called wide-angle, panoramic, spherical or panospheric, based on the extent of viewing field that is shown.

There are a number of useful purposes for products based on this technology. Such a camera system is useful for security purposes for monitoring large public areas, such as common areas around a university campus, and it is equally valuable for protecting dormitories or military barracks either domestically or in foreign countries. Asset protection is another valuable use, in which voluminous warehouses and their external traffic areas, supply depots or stockyards can be viewed from a central camera location, yielding reduced deployment cost, or multiple locations, yielding more extensive coverage as well as redundancy. Some models of these devices are practical for surveillance, since the camera head is small, and this function is appropriate for airports, other transportation hubs, in public buildings, and in military surveillance applications. A similar use includes deployment of the system in battlefield settings to track movements and provide comprehensive first-hand views of combat situations, and it is equally effective in urban police and fire-rescue actions and when coupled with a robotic vehicle in hazardous surroundings.

Another military use is that of surveillance of vehicles in the area surrounding warships. In this application, it is important to track and identify objects in the area of a ship whether it is moored in a harbor or tied up to a dock. In many ports, active sensing systems such as radar and sonar are considered intrusive by the foreign host country or municipality. Accordingly, a need exists for imaging systems that calculate distances and can track objects through passive imaging means over widely varying distance ranges.

Additional uses may be found in the commercial world. A full 360° stereoscopic video transmission would be valuable in promoting retail locations, sporting/entertainment events, real estate properties for sale, and news events to remote audiences, providing an audio and video experience similar to being on-location but without the incumbent travel or time expenditures. Similarly, videoconferencing technologies save significant amounts of money for businesses by reducing travel for face-to-face meetings, but the experience can be significantly enhanced by providing images of meeting counterparts in 3 dimensions. Immersive travel and educational video is supported by this design, and the commercial potential for such uses is staggering. Some of the attraction for the technology is related to the wide FOV, but the major attraction is in coupling this characteristic with true stereoscopic capture and viewing.

The scientific research is voluminous on the specific benefits inherent in stereoscopic image acquisition and viewing. Stereoscopy presents a more natural experience that supports smoother conscious performance of tasks (For general information refer to Rosenberg, L. B. "The Effect of Interocular Distance upon Depth Perception when Using Stereoscopic Displays to Perform Work within Virtual and Telepresent Environments," Interim Report for Project Number 7231, January–June 1992, carried out at Stanford University Center for Design Research.) partly due to the fact that stereoscopic views stimulate pre-attentive processing in the primary visual cortex for faster subconscious recognition (For general information refer to <http://gatsby-.ucl.ac.uk/~zhaoping/preattentivevision.html>; <http://www.ccom-jhc.unh.edu/vislab/VisCourse/PreAttentive.html>).

Superior object positioning during remote manipulation has been demonstrated through a number of studies (For general information refer to Merritt, J. O., Cole, R. E., Ikehara, C.: "Interaction Between Binocular and Monocular Depth Cues in Teleoperator Task Performance," Society for Information Display International Symposium Digest of Technical Papers, Playa del Rey, Calif.: Society for Information Display, May 1992; Merritt, J. O., Cole, R. E., Ikehara, C.: "A Rapid-Sequential-Positioning Task for Evaluating Motion Parallax and Stereoscopic 3D Cues in Teleoperator Displays," IEEE Conference Proceedings on Systems, Man, and Cybernetics, 91CH3067-6, October 1991, pp. 1041–1047; Smith, D. C., Cole, R. E., Merritt, J. O., Pepper, R. L.: "Remote Operator Performance Comparing Mono and Stereo TV Displays: The Effects of Visibility, Learning, and Task Factors," Kailua, Hi.: Naval Ocean Systems Center, Hawaii Laboratory, Technical Report 380, February 1979; Spain, E. H., Holzhausen, K. P.: "Stereoscopic versus orthogonal view displays for performance of a remote manipulator task," Stereoscopic Displays and Applications II: Proceedings of the SPIE, Vol. 1457. Bellingham, Wash.: Society of Photo-Optical Instrumentation Engineers, February 1991; Touris, T. C., Eichenlaub, J. B., Merritt, J. O.: "Autostereoscopic Display Technology in Teleoperation Applications," Proceedings of the SPIE, Vol. 1833. Bellingham, Wash.: Society of Photo-Optical Instrumentation Engineers, February 1993.), and it is particularly useful in remote explosives handling (For general information refer to Dracsic, D., Grodski, J. J.: "Using Stereoscopic Video for Defense Teleoperation," Stereoscopic Displays and Applications W: Proceedings of the SPIE, Vol. 1915. Bellingham, Wash.: Society of Photo-Optical Instrumentation Engineers, February 1993). These advantages are present using either autostereoscopic or stereoscopic head-mounted displays (HMD), in which distance estimation errors for short distances were significantly decreased through use of a stereoscopic display device (For general information refer to Singer, M. J., Ehrlich, J., Cinq-Mars, S., Papin, J.: "Task Performance in Virtual Environments: Stereoscopic vs. Monoscopic Displays and Head-Coupling", U.S. Army Research Institute for the Behavioral and Social Sciences, Technical Report 1034, December 1995). Stereoscopic imaging also provides more accurate distance recognition than ordinary estimation techniques, which when added to directional information yields effective real-time targeting methods that are easily automated for visually tracking moving people or objects without intrusive sensing techniques.

Current technology has not heretofore provided all of the features and quality necessary for truly immersive experiences, so this invention contributes by advancing the state-of-the-art in video acquisition and signal management. The nature of conventional video cameras is that they supply only limited depth and width of field, and the same is true of most still image cameras not employing ultra-wide-angle lenses. Several approaches to wide FOV imaging are available that use single sensors for the capture apparatus or employ various optical or motorized mechanisms, but these have limitations. There are also several techniques for capturing stereoscopic images, but these are usually incompatible with full 360° views at all times. The following technologies are examples of devices used for stereoscopic or wide FOV coverage of visual environments.

Stereoscopic images were originally taken early in the 1900's by exposing two negatives in side-by-side cameras, producing a pair of images that could be viewed with a companion photograph holder designed to position the combined pair of images at the right distance from each other and from the eyes. These initial camera systems were both bulky and limited to still-life compositions, but they provided a higher sense of reality through the depth effect of stereo viewing. Accordingly, a need exists for practical portable video systems that can produce the stereoscopic viewing effect with moving images.

Related Art

More recently, video cameras have been paired-up to capture stereoscopic images and video streams. Coupled with mechanisms for moving the camera pair around, pan-tilt-zoom (PTZ) mechanisms support wide scope of visual field through such movement and have the potential for optical zooms that can magnify scenes, improving resolution by trading it for reduced FOV. Lipton (For general information refer to U.S. Pat. No. 4,418,993), and Miura et al. (For general information refer to U.S. Pat. No. 4,879,596) disclose paired camera systems that can be moved about to cover wider collective FOV than stationary camera systems.

However, there are drawbacks to that mechanism. The motorized mechanisms of PTZ cameras have lag times associated with physical movement, high power consumption, limited rotational extents, FOV obstructions by motor and supports, maintenance and mechanical wear of moving components, and the risk of loss of calibration over time. There is also a concern over response time, size, weight, and reliability. Most critically, PTZ cameras can only capture the visual field where they are directly pointed at any given instant in time, limiting the usefulness of such a system for telepresent operations or viewing. Nonetheless, there are many commercial suppliers for monoscopic versions of PTZ cameras, including Pelco (For more information, refer to Pelco Spectra II: <http://www.pelco.com/catalog/camera-site/camerasystems/spectra/21487.htm> which is hereby incorporated hereinto its entirety), Panasonic (For more information refer to Panasonic WV-CS854 Unitized Dome Camera: <http://cctv.panasonic.com/specsheets/WV-Cs854A.pdf> which is hereby incorporated hereinto in its entirety), Sensormatic (For more information refer to Sensormatic SpeedDomes: <http://www.sensormatic.com/vsd/SEC/domes.htm> which is hereby incorporated hereinto in its entirety) and Everest VIT (For more information refer to Everest VIT: <http://www.everstvit.com/ptz/index.html> which is hereby incorporated hereinto in its entirety). There is, therefore, a need for a stereoscopic image and video acquisition system that can capture the full panoramic visual fields around the camera system without the drawbacks of mechanical movements.

As an alternative to physically moving entire camera systems, a flat mirror can be pivoted around above an upward-directed camera, allowing different areas around the camera to be captured, as is shown by Morgan (For general information refer to U.S. Pat. No. 4,499,490). Similar to PTZ systems, this design can only view or acquire a portion of a surrounding environment at any given instant in time.

Catadioptric approaches can provide a wide visual field at video rates, covering an entire 360° FOV (horizontally) seamlessly by reflecting the entire surrounding scene onto a single image sensor. Representative patents for curved reflectors (some also include refractive optics) (For general information refer to: U.S. Pat. Nos. 5,845,713; 5,790,181; 5,790,182; 6,003,998; 5,473,474; 5,920,376 and 4,566,763). Commercial suppliers include BeHere (For more information refer to BeHere: <http://www.behere.com> and "New Movies Take on a Different Perspective", pg. 6G, Sun-Sentinel, South Florida, Jun. 11, 2000 which is hereby incorporated hereinto in its entirety) and RemoteReality (For more information refer to RemoteReality: <http://www.remotereality.com/products/paramax.html> which is hereby incorporated hereinto in its entirety), and many universities have explored this approach, including Carnegie Mellon, MIT, Columbia, LeHigh, Kyoto, UC-San Diego (For more information refer to University listing page for omnidirectional designs: <http://www.cis.upenn.edu/~kostas/omni.html> which is hereby incorporated hereinto in its entirety). A number of patents have been awarded that employ various reflective and refractive optics for wide FOV acquisition (For more information refer to U.S. Pat. No. 5,854,713 (Kuroda+, 1998); U.S. Pat. No. 5,790,181 (Chahl+, 1998); U.S. Pat. Nos. 6,003,998 and 5,790,182 (St. Hillaire, 1999 and 1998); U.S. Pat. No. 5,990,934 (Nalwa, 1999); U.S. Pat. No. 5,920,337 (Glassman+,1999) which is hereby incorporated hereinto in its entirety), and these are used extensively in consumer grade telescopes. These types of cameras have shortcomings inherent in their design approach, though. Their resolution is limited to that of the individual image sensors that are used to pick up the light, so high resolution requires high priced sensors.

The nature of a catadioptric optical system is that distortions yield a non-uniform pixel distribution across the surface of the individual imager which has an impact on the quality and subsequent extent of digital zooming and magnification of prints. Distance measuring (ranging) is limited to estimations, which are potentially computation-intensive and prone to error. Alternatively, accessory sensing modes and devices must be added to perform this function. Because the images are distorted by the wide-angle lens, de-warping software should be designed for real-time use in video applications. Accordingly, there is a need for a camera system that can achieve a more uniform and higher resolution distribution of the light from objects onto the surface of the imager components.

Rather than use a curved reflective surface such as the one employed by the BeHere system, a related approach involves a downward-pointed reflective pyramid coupled with multiple image sensors beneath the pyramid. This approach is explained (For general information refer to U.S. Pat. No. 5,990,934 and U.S. Pat. No. 5,745,305) by V. Nalwa of Lucent Technologies. With this approach, the sensors point up at the pyramid, which reflects the scene from 360° around the camera horizontally. By using one image sensor for each reflective face of the pyramid, this method improves overall resolution over single-imager/reflector systems. While the use of multiple sensors increases the number of image-sensing elements involved in scene capture, this method suffers from an inefficient use of image sensors, since it is not possible to fully inscribe a triangle within a square with complete coverage. There is also a requirement for seaming across four overlapping edges. Accordingly, there exists a need for an efficient image capturing method that provides high resolution and high uniformity of pixel distribution with its wide FOV.

A complete spherical view can be achieved with multiple cameras pointing in all directions, providing excellent resolution in portions of the spherical images that are viewed in normal aspect ratio on conventional devices, such as TVs or monitors. One such system is a dodecahedral camera design from iMove Inc. (For more information refer to iMove Inc.: <http://www.imoveinc.com> which is hereby incorporated hereinto in its entirety), which captures a complete spherical view of the entire environment and does so at video rates. (For general information refer to U.S. Pat. Nos. 5,023,725 and 6,141,034 by McCutcheon). The design emphasis is on complete spherical coverage by a collection of cameras, with as little overlap between cameras as possible to maximize efficiency in capture. Based on its design, however, there is no practical stereoscopic video acquisition, as well as no true distance measuring.

In addition, current implementations have a large physical size and significant communication requirements. Systems are currently only available for rent, adding to the limitations for their use in many applications. University of Maryland has developed a similar structure with multiple imagers arrayed on a spherical surface (For more information refer to University of Maryland: <http://www.cfar.umd.edu/~larson/EyesFromEyes.html> which is hereby incorporated hereinto its entirety) that is useful for many different types of analysis, but, at this time, it is available for research-oriented purposes only. There is therefore a need for a very wide FOV image capture system that can produce true stereoscopic images and video, while doing so in practical packages.

Another approach for acquiring large FOV scenes is through using very-wide-angle optics such as fisheye lenses, as demonstrated by McCall et al. (For general information refer to U.S. Pat. No. 6,002,430). Combining two such lenses back-to-back allows capture of almost a full spherical view but introduces image construction problems unique to the design. Dual hemispheric lens systems like this one from Internet Pictures Corp. (For more information refer to Internet Pictures Corp.: <http://www.ipix.com> which is hereby incorporated hereinto in its entirety), for example, have edge-seaming requirements in difficult-to-seam areas (the low resolution portions of the image), fisheye effects (changing apparent depth based on direction of view), non-uniform pixel distributions over the face of the imagers, and limited resolution. The system cannot acquire stereoscopic video in real-time. Nor can it measure distances.

One of the simpler ways to use multiple imagers is to place all of them on the same plane radially directed outward from a central point. The benefit of such a design is the ability to produce images that can be viewed remotely as if the viewing person were at that central point of the camera system. Such a design has been disclosed by Henley (For general information refer to U.S. Pat. No. 5,657,073), and it is capable of producing either panoramic or panospheric output images that can be panned, tilted, rotated or digitally zoomed through an accessory controller. This is a useful approach for monoscopic views of an environment, but it is incapable of capturing full stereoscopic views or distance measurements. Accordingly, a wide FOV stereoscopic video capture system is needed to support more realistic representations of visual environments.

Another way to put multiple imagers together in a planar fashion radiating out from a central point is disclosed by Rogina et al. (For general information refer to U.S. Pat. No. 5,703,961). Rogina's method supports high resolution and real-time stereoscopic acquisition, but the radial planar configuration of multiple imagers limits viewing of near-field subjects, requires a large number of imagers taking up a large physical space, and consumes significant communication bandwidth. While this provides a middle ground between individual imager systems and full spherical arrays, it is expensive to produce and is not designed to independently measure distances without additional external sensors.

Judd et al. (For general information refer to U.S. Pat. No. 5,612,533) and Glassman et al. (For general information refer to U.S. Pat. No. 5,920,337) disclose improving the size requirements by mounting light sensors on a horizontal planar substrate and using a reflective mirror or prism next to each sensor and a lens at the edge of the planar substrate. Processing of the image data from the collection of imagers then forms a panoramic digital data strip that can be viewed as a continuous panoramic image. There is no provision, however, for stereoscopic capture or distance measurement in this radial arrangement of components.

The RingCam omnidirectional camera (For more information refer to Microsoft: <http://research.microsoft.com/~rcutler/ringcam/ringcam.html> which is hereby incorporated hereinto in its entirety) from Microsoft is a planar layout of low-cost imagers that achieves good resolution. Rather than direct all imagers outward radially from a central point, however, the RingCam rotationally offsets the camera sub-systems so that the full 360° panorama can be covered including much of the near-field without being occluded by the other camera sub-systems in the layout. This method does not support stereoscopy or ranging (i.e., distance measurements).

Yamamura et al. describe a different planar arrangement of three cameras to capture a wide FOV (For general information refer to U.S. Pat. No. 5,880,815) which is directed to preventing overlap or lack of image content between cameras. The use of mirrors allows the inventors to keep all of the three cameras on the same plane and line up the edges of the three images for seamless presentation. This method does not encompass full 360° panoramic acquisition, nor is it capable of stereoscopy.

Hankawa et al. (For general information refer to U.S. Pat. No. 5,727,239) describes a photography apparatus that can change the arrangement of optical paths through reflective members to capture either wide FOV or stereoscopic images on a single image sensor or film. This system is significantly limited in resolution and the extent of its FOV, not acquiring even 180° of visual content. Katayama et al. (For general information refer to U.S. Pat. No. 5,668,595) describes a different apparatus that can alternate between "panoramic" (though nowhere near 360°) and stereoscopic modes through the use of 2-imager sub-systems, but this is likewise limited in the extent of its FOV. Katayama et al. disclose a method for achieving high image resolution by integrating the outputs of multiple imager sub-systems (For general information refer to U.S. Pat. No. 5,668,595). This system targets detection and correction of misalignments and keystone distortions that might occur between two camera sub-systems. The method does not teach the coincident alignment of multiple imaging sub-systems through manufacturing processes to ensure inter-pixel spacing for high resolution.

Due to the aforementioned limitations of other techniques and to support immersive imaging and telepresence, there exists a need for a very-wide-FOV stereoscopic imaging system that can capture stereoscopic images and measure distances to objects with few to no moving parts.

SUMMARY OF THE INVENTION

The present invention relates to methods and apparatuses for capturing, processing, managing, analyzing, storing and displaying stereoscopic image information from large-field (wide and deep) visual environments to support realistic viewing for users as if they were physically present at the location of image capture. It advances the state of the art and defines a practical architecture and system for continuing improvements in resolution and detail analysis as component technologies progress, as well as enhanced viewing through stereoscopic capture and display and the ability to measure distances without secondary sensing technologies. The use of multiple low-cost electronic imaging sub-systems and PC-supported analyses provides the flexibility in platform implementation to cover a spectrum of solutions from very high resolution/high analysis to good resolution/limited analysis at various price points, all following the same basic architecture.

The present invention defines a method of producing stereoscopic, monoscopic and hyper-stereoscopic imagery through various configurations of multiple imaging sub-systems, adjusting views to present separate left-eye and right-eye views at average interpupillary separation distances as would be perceived by a person viewing the scene in person. The system is capable of capturing a full 360° horizontal panorama at one time, allowing multiple independent viewers to look at any subsets of the panorama stereoscopically or monoscopically as each prefers, the views of which may be displayed on any number of stereoscopic or monoscopic viewing devices, such as computer monitors, autostereoscopic monitors, HMDs or shutter glasses, for example.

The system is composed of a compact remotely-operable camera head unit with multiple imaging sensors, a set of circuits for processing and optionally analyzing the image streams, means for digitally recording and playing back the video or still images, and viewing monitors, which may include a traditional monitor for controlling aspects of the images and an optional monitor for viewing images stereoscopically or in greater detail (while still keeping control functions in view on the other monitor).

Other embodiments of the system include a combined monoscopic/stereoscopic version, a reduced-size model for individual field use, a model with dynamically-adjustable stereoscopic viewing ranges, a videoconferencing model, and an associated playback unit for playing pre-recorded or transmitted material as might be captured by such systems.

The architecture is scalable in many ways, as follows:

1) It can operate with different numbers of imaging sub-systems preferably packaged in a remotely operable camera head. The principles of the invention support numbers of camera sub-systems down to 3 (monoscopic) and 6 (stereoscopic), but higher resolutions can be accommodated through larger numbers of imagers, associated in pairs for stereoscopic acquisition. It is reasonable to include additional imager sub-systems in more advanced models as needs exist to support additional features related to resolution, analysis and FOV coverage of a visual space.

2) The signals are supplied to several sets of circuits packaged in a variety of ways to support multiple independent stereoscopic and monoscopic viewers, each with the freedom to select which portions of the immersive image to highlight, magnify through digital zooming, display in stereo, and so on.

3) The signals are also supplied to additional circuits packaged in a variety of ways that can perform multiple types of analysis on the image data simultaneously, depending on the complexity of the calculations and the number of analyses required. This is an important feature in many markets, in which several independent analyses may need to be conducted concurrently. Some types of analysis are currently known, while others are yet to be identified. This structure, therefore, serves to give the greatest flexibility for further system development and satisfaction of customer needs.

4) Due to the camera head design for stereoscopic acquisition, various elements of the system may fail (for whatever reason) and the system can continue to operate in reduced fashion, such as in monoscopic mode or stereoscopic viewing except in some fields-of-view, providing the user with at least partial functions. This is especially useful in some projected military and hazardous environments where the provision of partial images is significantly better than no images at all.

5) The mechanical configuration of the camera head is such that the relative positions of the imaging sub-systems may be symmetrically varied to provide differing ranges of stereoscopic depth acquisition, which is useful for imaging either well beyond or well inside normal stereo viewing ranges (e.g., beyond 300 feet normally and on microscopic levels, respectively).

6) Smaller optical components may be employed in the camera head to reduce the size, and servo-controlled zoom lenses and optical filters and different fields of view are also employed in keeping with the design principles and features of the system.

There is a wide array of possible packaging configurations for the camera head, the viewing/analysis modules, and the digital video recording (DVR) sub-system. While the head is expected to be placed in the smallest practical package and made suitable for remote external use in harsh environments, the viewing/analysis circuits and DVR may be either sub-systems of a personal computer/workstation (PC), attachments thereto, or standalone units optionally connected to external or contained display devices (e.g. playback units, set-top boxes, etc.). In one embodiment, a system built according to this design is packaged for example with a PC and an external autostereoscopic display.

Some of the advantages of the present invention are high-resolution video with uniform pixel distributions across large fields of view, optionally acquiring true stereoscopic images using no moving parts (in at least one embodiment) and providing distance measurements, at reasonable production costs. While it can take advantage of ongoing improvements in CMOS imager performance and concomitant cost reductions, the architecture is flexible and is designed to accommodate any other type of electronic sensors (such as CCDs, CIDs, etc.) as might be preferred for specific imaging parameters (i.e., low-light/night operation).

Furthermore, the architecture is defined to be suitable for different types of and improvements in imaging sensors as they may appear over time, while still providing the fundamental features of the system such as stereoscopic capture, analytical capabilities and distance measurement. The architecture is also specifically designed to take advantage of previous-generation imaging sensors that are priced attractively because a newer generation sensor has been introduced. Although such sensors may not have the full resolution of the newest sensors, the combination of multiple older sensors can provide significant cost/performance advantages over the latest individual (high cost) sensors.

Among the characteristics of this design is the ability to measure distances through triangulation of stereo images without the use of invasive sensing technologies. This has been a recent requirement for use in some military situations, in which it is considered intrusive to foreign hosts to be continuously probed with radar or sonar devices, even for the purpose of protection from terrorists in those ports. Passive stereo ranging is a key feature of this invention that is also valuable for measuring area dimensions and for tracking people and objects. It has the added advantage of not requiring any additional sensors with their associated circuits.

Advantages of the Invention

One of the advantages of the invention is that it provides an apparatus for stereoscopic image capture of 360° panoramic environments at speeds up to video rates (30 fps) and beyond without the use of moving parts in the acquisition process. This includes wide and deep field-of-view stereoscopic acquisition of environments, correcting, transmitting, modifying and aligning image subsections as necessary to present a seamless rendition of the entire panoramic scene to multiple individuals and/or processing sub-systems. The width of field typically includes 360° in the horizontal plane and at least 20° above and 20° below the horizon in the vertical plane.

A further advantage of this invention is the creation of two superimposed video or still image data sets of scenes that might be viewed by a person with normal binocular vision sitting or standing in a single spot and rotating his head/body around in a circle. One of these data sets is oriented to convey views that would be seen by the right eye; the other data set is oriented to convey views as they would be seen by the left eye. This definition of superimposition is appropriate because the two data sets represent views that appear to simultaneously coexist in the same spatial volume.

It is a further advantage of this invention to support multiple independent viewing and/or analysis stations, each handling subsection views with potentially different orientations and magnifications and all originating from the same dual superimposed image data sets.

It is also an advantage of the invention to support pan, tilt and digital zoom functions of the resultant stereoscopic images without moving parts in at least one embodiment of the system.

It is a further advantage of this invention to dynamically correct right-eye and left-eye views from individual camera sub-systems to re-establish average interpupillary separation distances, providing a seamless panorama with consistent stereopsis effects.

Another advantage of the invention is that it performs distance measurement analyses of such stereoscopic images so as to provide distance and direction figures-of-merit for use by viewing individuals or analytical processes.

Another advantage of the invention is a predominantly monoscopic embodiment of this system with a camera head assembly that can momentarily change optical component positions to capture stereoscopic views, accomplish passive stereo distance measurements, and track moving objects, among other activities, on a selective basis for a subset of the panorama.

Yet another advantage of this invention is that the camera head is optionally packaged as a reduced size model according to the principles of this invention that is useful for field applications in both military and commercial settings.

A further advantage of this invention is the ability to control pan, tilt and zoom operations through operations of software based on objects or conditions detected in the environment.

Another advantage is the embodiment of this invention so as to provide stereoscopic videoconferencing capabilities with a method that supports automatic and manual selection of views and provides remote views of participants and proceedings in stereo views.

Another advantage of this invention is that it defines and describes a low-cost playback apparatus that is useful for playing pre-recorded or transmitted stereoscopic video materials for education, entertainment, simulation or other purposes.

Another advantage of this invention is that some embodiments of the system vary the spatial positions of the various components in the optical sub-systems to facilitate different ranges of effective stereoscopic viewing and enhanced far-field distance measurements. This embodiment includes a variety of adjustment means and optionally includes adjustable zoom lenses and wide-angle optics or reflective elements.

Another advantage of the invention is a technique to establish alignment of imagers within the camera sub-systems in the manufacturing process (or later alignment procedures) so as to eliminate the need for dynamic seaming between image subsections or automated construction of a mosaic, while allowing dynamic adjustment of subsection boundaries electronically as needed during the course of operation.

Another advantage of the invention is that it optionally corrects for distortion, reversal, perspective, optical aberrations and other effects in circuitry or processes within the camera head prior to optional compression and transmitting of the image data streams from the remote camera head. The system can also be configured to perform these functions in one or more of the processing units.

It is also an advantage of the present invention to support the ability to receive, process, display and control subsections or full panoramic images with devices that may be packaged in any number of ways, including but not limited to: standalone devices; cards that plug into PCs; PC systems using combinations of hardware, software and firmware; handheld or laptop computers; and playback-only units.

It is yet another advantage of this invention to support display of an entire panorama in full or subsampled form (depending on monitor capabilities and user preferences) and to support selection of subsections for detail or stereoscopic viewing and/or specific analysis through simple manual computer input devices such as a mouse, keyboard, joystick, button, touchpad or other control devices.

It is another advantage of this invention that various embodiments of the camera head adjust for low light and daylight usage periods by using movable IR filters.

It is yet another advantage of the invention that it selectively provides various data output formats to accommodate different transmission and display protocols for use on computers and television monitors (e.g., NTSC RS-170, SDTV, HDTV, PAL) or as input to digital video or other recording devices.

Another advantage of the present invention is that at least one embodiment serves as a system for surveillance that has either automated or manual tracking of people, objects or areas being viewed.

It is also an advantage of this invention that it provides means for aligning imaging systems such that all right-eye sensors are in direct alignment with each other, and all left-eye sensors are in direct alignment with each other and located at inter-pixel positions with respect to right-eye sensors according to drawings and descriptions of the present invention. The benefits resulting from such alignments are increased resolution and improved digital zooming capability.

Yet another advantage of the system is the ability to create multiple movie sequences from subsets of the 360° image data in conjunction with various audio tracks, accessory data, and time-based and sequence-based identifier codes.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 1 is an illustration of one embodiment of a camera system having a tripod-mounted/mast-mounted camera head and a connection to a PC-based processing system, according to the present invention.

FIGS. 2a–2e illustrate designs employing different numbers of imager pairs in the camera head, as well as different methods of orienting the lens and mirror in the optical sub-system for directing the optical paths of light rays to the imagers.

FIG. 7a illustrates the different FOV lines and perspectives for stereoscopic views created from interpolated image data, while

FIG. 12a is a simplified cover-less drawing of an exemplary 4-imager monoscopic version of a camera head according to the present invention, while

FIGS. 13a–13b illustrate two mechanical methods for moving components of the optical and imaging subsysesm (imager/lens/mirror assemblies) in accordance with the production of varying ranges of stereoscopic views for the adjustable-range stereoscopic version of the present invention.

FIG. 14 is the functional block diagram of a representative playback unit that plays stereoscopic or monoscopic panoramic video materials from pre-recorded media or transmitted stereoscopic data streams from cable, satellite, the Internet or other media.

FIG. 15a illustrates the a videoconferencing system embodiment, while

FIGS. 16a–16b show a combined mirror assembly and its associated optical paths used to create higher resolution stereoscopic images through inter-pixel alignment, while

FIG. 19 illustrates how panoramic images are assembled through overlaps of captured image subsections.

DETAILED DESCRIPTION OF THE EMBODIMENTS

Figure 3:
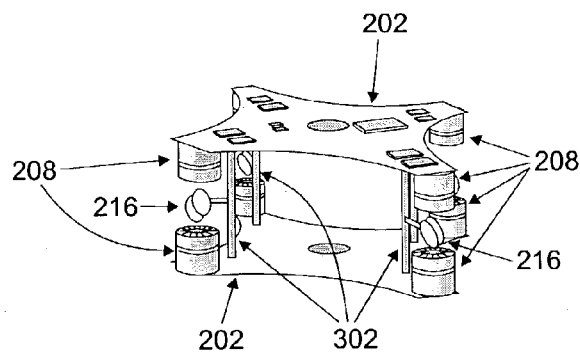
FIG. 3 is a simplified coverless drawing of an exemplary 4-pair camera head showing various components.

The present invention is based on the concept of acquiring and processing dual superimposed video image data sets. The acquisition of images is accomplished without moving parts by properly positioning multiple imager sub-systems and coplanar reflective elements. Operation of the system builds a data set for each of the views that a person's eyes would see if he/she were to move his/her head around at a fixed point in space. In preparation for transmission, the video image data from each of the imager sub-systems is processed through several operations while in the camera head. The data is reversed, preferably corrected for distortions and aberrations, compressed, transmitted from the camera head to a processing unit (preferably with data compression), merged into a continuous data set, then viewed on monitors. A monoscopic version of the complete data set from either set of imagers is presented on a monitor in one of several formats based on user preferences. These formats include but are not limited to a full panorama all the way across the screen, half panoramas one above the other, or other segmentations of the image. This presentation of the data may be done by subsampling the complete image data if the monitor does not have high enough resolution to show the entire panorama in the desired display format.

Alternatively, a subset of the data may be viewed on a small portable display. Windows of interest from this collective panoramic data may then be selected by a user to present images of greater detail on optional secondary monitors. One such arrangement employs an autostereoscopic unit to show stereoscopic outputs from the imagers along with analytical data or other information of interest as calculated/gathered by the system. Alternative display devices include but are not limited to stereo-view LCD glasses and HMDs (head-mounted displays).

General:

FIG. 1 shows one embodiment of a camera system having a tripod-mounted/mast-mounted camera head and a connection to a PC-based processing system. Multiple imagers (not individually shown) are arranged inside a camera head 102 to capture superimposed image data of the surrounding area. The camera head 102 is supported by a mounting rod 104 that extends it above a tripod 106 to minimize inclusion of the tripod 106 in the imaging data. A cable 108 conveys the imaging data from the camera head 102 to processing unit cards (not shown individually) or personal computer (PC) and software within a desktop-style PC 110. Alternatively, the image data could be conveyed by other communications methods, such as RF. A standard PC monitor 112 provides a full panoramic view for control actions and selection of detail windows, while an attached autostereoscopic monitor 114 shows the detail views of areas of interest in stereoscopic mode.

The present invention generates the stereoscopic panoramic image data with an even number of imager sub-systems, with at least 3 pairs. 3 pairs of imagers represent a practical minimum number, but the concept is functional at 2 pairs as well. To gain a distinct advantage over alternative single-imager approaches with current reasonably priced components, higher amounts of imagers may be employed. For descriptive purposes, a representative exemplary embodiment with 4 pairs of imagers serves as the basis of the present invention. However, it should be apparent to those skilled in the art that higher numbers of imager sub-systems can produce higher resolutions and other enhanced effects, and that using four pairs is not a requirement or a limitation.

FIG. 2 shows several top-down views of representative capture boards containing imager sub-systems for 4-pair, 5-pair and 6-pair camera heads. The computational resources allocated to these operations in the processing unit must be proportionally incremented for each increase in imager sub-systems, but the same general principles of operation, control and display methodology apply.

Referring now to the top-down views of FIGS. 2a–2c, circuit boards 202, 204, and 206 contain the imaging sensors, their associated interface components, lens-mounting structures, reversal and distortion-correction circuits, compression circuits, and communication formatting logic and transmitter/receiver components. The sensors are any type of area sensors such as CCD, CMOS and CID. Lenses 208 are shown over the positions of the image sensor arrays. It is clear that many of these functions can be accomplished through processing means and/or firmware, as well as discrete logic circuit components.

In the edge-wise diagram of FIG. 2d, lens 208 is preferably attached to a lens-mounting structure 210 to direct the optical path. This lens-mounting structure 210 is attached to the circuit board 202/204/206 so as to direct the view of the image sensors 212 away from the circuit board 202/204/206 on a line perpendicular to the plane of the circuit boards. This line-of-sight follows the optical path arrows 218 as they reflect off of the reflective element 216.

An alternative layout of the optical path, as shown in FIG. 2e, includes a reflective element 216 directly above the image sensors 212. This changes the optical path 218 by 90°, then directs the view through the lens 208. It should also be apparent that mounting of the image sensor on a smaller separate circuit board (not drawn) that plugs into the capture circuit board would be equally effective at capturing the desired FOV and might have other advantages. There are different size and shape characteristics for each layout of optical sub-system that may be preferred by various customer sets. The design for the camera head calls for two opposing capture boards with several pairs of imagers and optical sub-systems.

FIG. 3 shows a simplified isometric drawing of a camera head with four pairs of imaging sub-systems attached to upper and lower circuit boards that perform the image capture role, according to one optical path method described above. It does not show covers or cables. The camera sub-system lenses 208 face adjoining mirrors 216 that are adjacent each other, but not directly back-to-back. The mirrors 216 direct their respective FOV to a subset of the visual space around the camera head. The lenses 208 are attached to the capture board 202 through a lens-mounting device (not shown in this view). Since each imager sub-system occupies a significant volume, use of upwardly and downwardly directed imagers with mirrors facilitates coplanar capture of the surrounding area without each imager sub-system being in the FOV of another imager. Maintaining all optical paths on the same physical plane is critical to avoid the capture of tilted views and allow for smooth transitions between images captured by different imager sub-systems.

A further advantage of this arrangement is that it simplifies the manufacture of the imager board assembly by allowing all components to be surface-mounted. The mirror supports 302 also form the mechanical joining structure for the two opposing capture boards 202. They are shown in their simplest form in this drawing, but may take different shapes to serve useful purposes and for differing numbers of imaging sub-system pairs. Such purposes include manufacturing efficiencies gained through preset positions for the mirrors, shock-absorbing properties and mass production capabilities. No fine-tuning adjustment mechanisms are shown, but these are rudimentary to those skilled in the art and are included in manufactured products, supplemented by electronic adjustment methods also well-known in the art.

The primarily direct view of the environment achieved by this mechanical arrangement has distinct advantages. In addition to simplified manufacturing techniques, the surrounding scene is more uniformly distributed over the imager surfaces. More of the surface area of a square or rectangular imager is utilized and the scene is more uniformly distributed over the pixel area, as compared to the capture using a fisheye lens according to methods taught in U.S. Pat. No. 5,185,667. Furthermore, market research shows that using different numbers of imagers is effective and appropriate for the needs of various customer sets, and this methodology supports such variations. This design also allows for compact (about 3.5" wide by 3.5" high) head dimensions using existing mass-produced components.

Figure 4A:
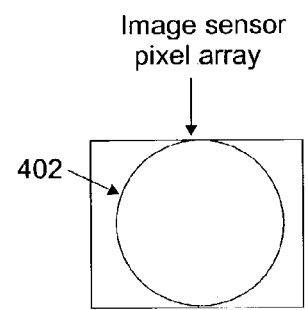
FIGS. 4a–4d show the relative projections of optical systems for various panoramic/spherical imaging systems.

FIGS. 4a–4d illustrate the critical aspects of uniformity of pixel distribution and utilization of available pixels. To make a direct comparison, FIG. 4a shows the pattern 402 that a fisheye lens of the Ipix design (For more information refer to Internet Pictures Corp.: <http://www.ipix.com>, which is hereby incorporated hereinto its entirety.) projects onto a hypothetical image sensor with 1280 horizontal pixels times 1024 vertical pixels. Using standard geometric formulae for the area of a circle and a rectangle, a fisheye lens uses about 823,549 pixels out of 1.31M pixels for a utilization of 63%. Although square imager sensors are not being used in this comparison, the utilization of pixel area improves to 79% if a square imager is employed. For comparative purposes, the descriptions will consistently use rectangular-shaped imagers characteristic of what is currently offered by manufacturers. However, due to warping effects of the fisheye lens, the scene is not uniformly distributed over the surface of sensor array. The result is that significant de-warping calculations must be performed to correct the aspect ratio, and these calculations reduce the extent of practical digital zooming based on spacing between pixels of interest.

Figure 4B:
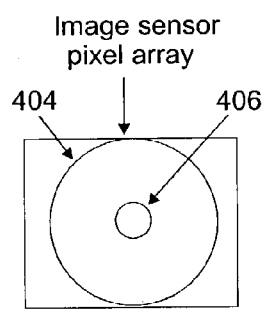

FIG. 4b is a catadioptric projection as might be employed in the BeHere design (For more information refer to BeHere: <http://www.behere.com>, which is hereby incorporated hereinto its entirety), with coverage extending from the outer edge of the projection 404 to the inner edge 406. This inner circle 406 is formed due to the nature of the central support structures incumbent in the design and occlusions by the camera lens and body, and these pixels are unusable for image capture. With the rectangular image sensor array of this comparison in mind, and assuming that this inner circle 406 diameter is $\frac{1}{10}^{th}$ the diameter of the outer edge circle 404, there are 741,194 pixels utilized, or 57%. This design has negative warping consequences similar to the fisheye lens.

Figure 4C:
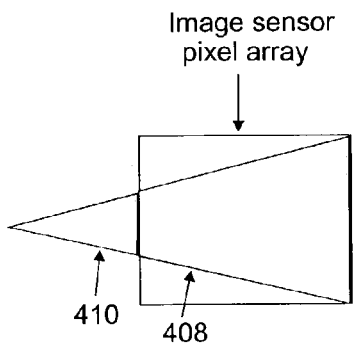

FIG. 4c is the projection of the Nalwa pyramid (For more information refer to V. Nalwa, "Method and System for Panoramic Viewing", U.S. Pat. No. 5,990,934 which is hereby incorporated hereinto in its entirety) onto one of the image sensors of that design. Utilization can be improved by extending the pyramid height beyond the length of the rectangular sensor array. This extension only brings the utilization of this design up to 68%, and the pyramidal extension area 410 results in either a loss of near-field scene capture, or includes reflections of the external part of the sensor array itself. In either case, although the utilization is not very good, there is a uniform distribution of pixels on the sensor array.

Figure 4D:
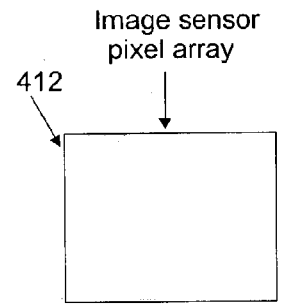

FIG. 4*d*, according to the present invention, shows the benefit of using a rectangular mirror to capture a portion of the scene. Since the coverage 412 is complete, utilization is 100% and the distribution of pixels is uniform across the surface of the image sensor array.

FIGS. 19*a*–19*b* illustrate the steps involved in the image capture and construction process. In FIG. 19*a*, the projection of a standard round lens onto an object plane is a circular image, shown as dotted line 1902. This will be projected onto an object plane that includes an image sensor 1901. Referring to FIG. 19*b*, a panoramic or spherical image mosaic may be constructed by overlapping the edges of captured scenes, represented by rectangles 1903, 1905, 1907, and 1909, which may be captured independently at separate times by repositioning the same sensor or by using additional sensors simultaneously. Projected areas 1904, 1906, 1908, and 1910 that are outside the edges of the image sensor may be included or discarded depending on the extent of visual field to be captured. Areas of overlap 1911, 1912, and 1913 may be used to properly align one imager's output with another.

Figure 5A:
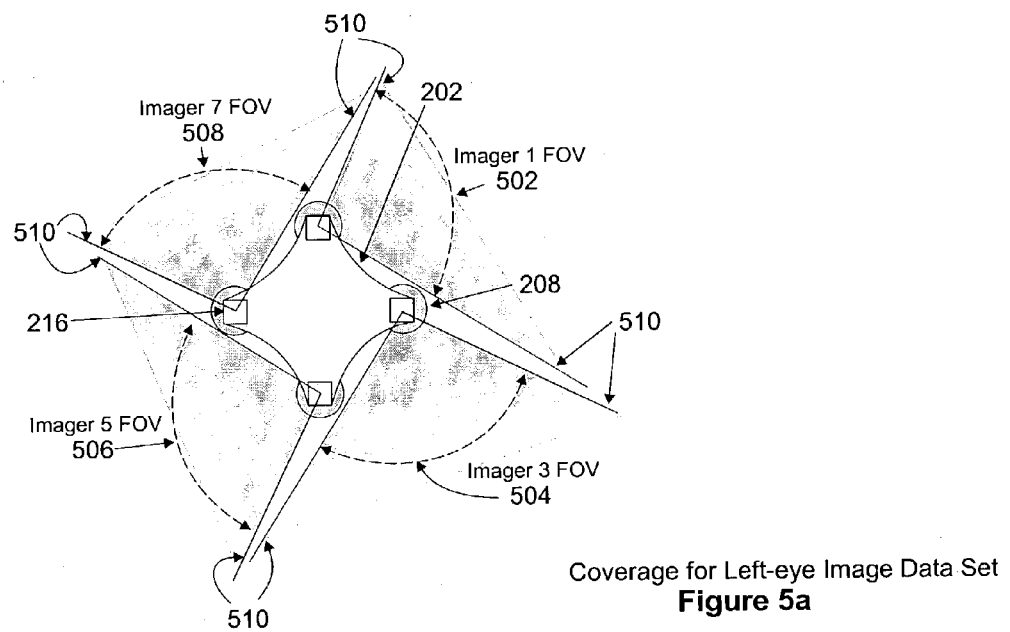
FIGS. 5a–5b illustrate the field-of-view coverage for left-eye imagers and right-eye imagers for a 4-pair camera head arrangement.
Figure 5B:
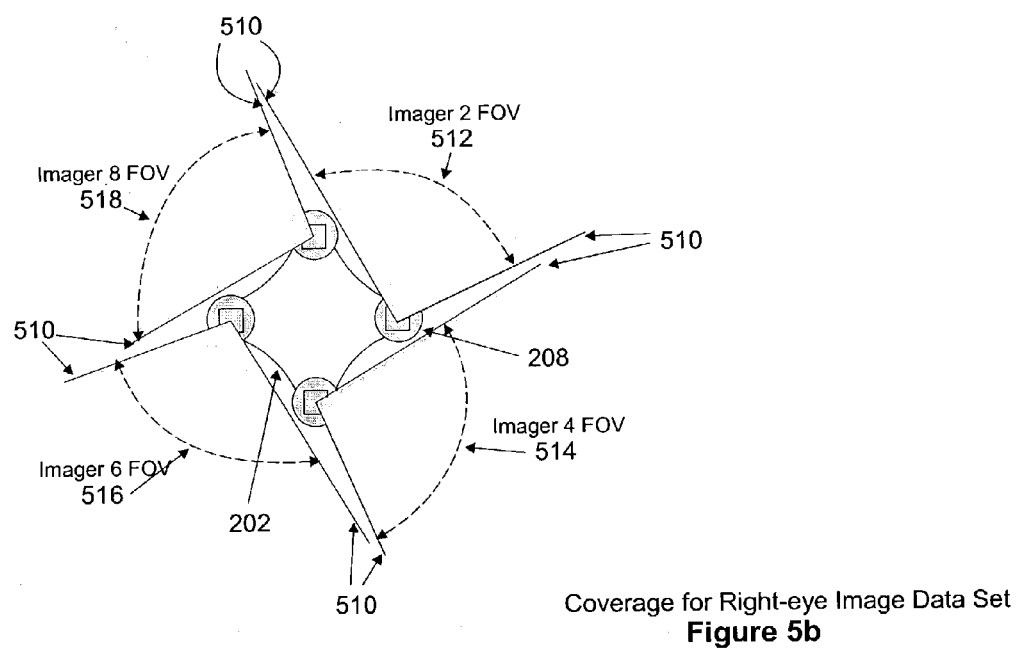

Referring now to FIGS. 5*a*–5*b* and the 4-imager-pair embodiment, each imager with its lens 208 and mirror 216 mounted on a capture board 202 takes in about a 95° horizontal FOV by about 90° vertical FOV. Each optical sub-system is rotationally offset in the horizontal plane just enough to avoid occlusions by a neighboring mirror and lens. This coverage allows 2.5° overlap at each horizontal image edge to accommodate manufacturing and operational electronic calibration without missing any part of the full-field view. The left-eye set of imagers is arbitrarily numbered 1, 3, 5, and 7, and the right-eye set of imagers is numbered 2, 4, 6, and 8. The imager 1 FOV 502, imager 3 FOV 504, imager 5 FOV 506, and imager 7 FOV 508 are each bounded by FOV edge extension marks 510 and span 95° (areas shaded for clarity).

Similarly, in FIG. 5*b*, imager 2 FOV 512, imager 4 FOV 514, imager 6 FOV 516, and imager 8 FOV 518 are bounded by FOV edge extension marks 510. Two full 360° horizontal panoramas can be constructed in this way by selecting a line in the overlap areas and discarding duplicate pixels. For all practical purposes, this arrangement builds complete right-eye and left-eye panoramic view data sets that are superimposed in the same space, allowing stereoscopic viewing with complete horizontal panning as well as tilting. This design provides excellent near-field coverage starting approximately 6" from the camera and extending outward, which is an important advantage of this design. Reaching a 95° FOV is accomplished either by using wide-angle lenses coupled with flat mirrors or normal FOV lenses coupled with slightly convex mirrors.

Differing curves/optical parameters of lens/mirror combinations in the optical sub-systems may be employed to capture more or less in the vertical dimension to satisfy customer requirements. Some combinations have accompanying distortion effects and are electronically corrected prior to displaying the panorama. The critical feature, however, includes capturing a complete panorama horizontally, with sufficient overlap between imager sub-systems to ensure complete coverage, while covering as much in the vertical dimension as called for by the customer set, good design practices and efficiency. It should be clear to those skilled in the art that there are many combinations of lenses and mirrors that satisfy this capture requirement.

Instead of simply mounting the camera sub-systems in a way to directly view their portions of the panorama as is disclosed in other patents, there are several reasons for this novel arrangement of reflective components:

Mirrors bring the FOV for both eyes to the same plane, which is important for non-tilted viewing (or to avoid additional corrective calculations). It also provides superimposition of each eye's image data set with the other eye's image data set.

Small mirrors volumetrically minimize the visual interference of each mirror with its neighboring imager's FOV. This reduces the overall size of the camera head and improves near-field coverage, even when using conventional commercial components.

The use of mirrors allows surface mounting of components on the opposing capture boards (a less expensive manufacturing technique) and supports manufacturing as the same part number. Reuse of complex assemblies improves volume manufacturing costs and helps reduce customer prices.

Substitution of the upper capture board assembly with a mirror actuator board allows the choice of sub-360° stereoscopic viewing with distance measuring or full panoramic monoscopic viewing even for a monoscopic version of the camera head (described later). This monoscopic embodiment can be produced with an even lower system cost.

Figure 6A:
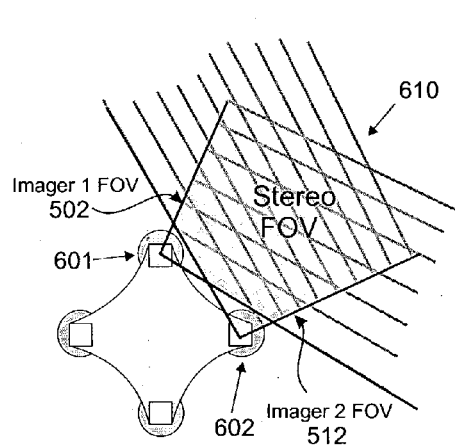
FIGS. 6a–6b show stereoscopic fields-of-view for adjacent imagers and opposite-side diagonally-disposed imagers for the exemplary 4-pair camera head arrangement.
Figure 6B:
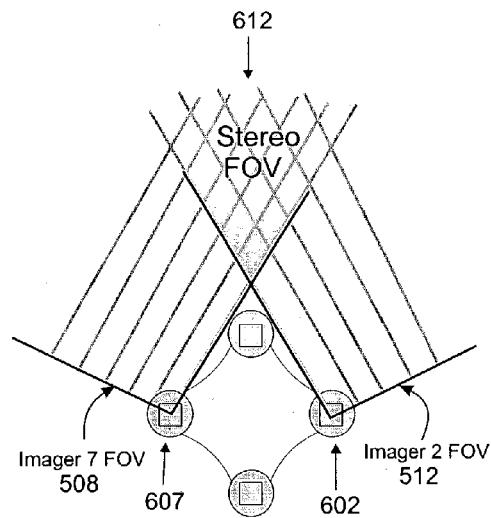

It is important to examine the method by which stereo images are created in FIGS. 6*a*–6*b*. In this embodiment of the system, the separation distance between imager 1 601 and imager 3 603 is set for 2.5", as it is for imager 3 603 and imager 5 605, imager 5 605 and imager 7 607, and imager 7 607 and imager 1 601. The same holds true for imager 2 602 and imager 4 604, imager 4 604 and imager 6 606, imager 6 606 and imager 8 608, and imager 8 608 and imager 2 602. This is the average interpupillary measurement for human beings. In 5-pair and 6-pair embodiments, the separation distance between adjacent imagers around the periphery of the capture board remains 2.5" according to the present invention.

According to FIG. 6*a*, stereoscopic viewing is available in the cross-hatched area 610 created by the overlaps of imager 1 FOV 502 and imager 2 FOV 512. Standard stereoscopic views are created from the left-eye and right-eye views, supplied by imagers 1 601 and 2 602, imagers 3 603 and 4 604 (not identified in FIGS. 6*a*–6*b*), imagers 5 605 and 6 606 (not identified), and imagers 7 607 and 8 608 (not identified). Similarly in FIG. 6*b*, "opposite-side" stereoscopic viewing is available in cross-hatched area 612 formed from the overlap of imager 2 FOV 512 and imager 7 FOV 508. "Opposite-side" viewing is so termed because the images come not from adjacent imager sensors, but from those on opposite sides of a 4-pair capture board. Areas 610 and 612 and all such standard and opposite-side stereoscopic fields overlap at the edges to allow complete 360° coverage of the environment.

The embodiment of FIG. 6*b* results in different interocular separation distances for all stereoscopic fields produced by opposite-side imagers, which collectively represents half of the 360° panorama. With the accompanying object size and depth effects of hyper-stereo viewing, there is a perceptual mismatch between different regions of the panorama that might be distracting to users as they pan from region to region, since the panning would otherwise appear seamless. An important advantage of this invention therefore is the interpolation process in hardware and/or software that re-establishes normal interocular views for FOV sections covered by diagonally-disposed imager sub-systems (e.g., imager 7+imager 2) to match their viewing effects with those from the standard stereoscopic views. The principles that facilitate this design are equally applicable to camera heads with more or less camera sub-systems.

It is desirable to create normal interocular separation distances virtually for opposite-side imagers. Accordingly, this is done by dynamically interpolating from the combination of incoming video streams.

Figure 7A:
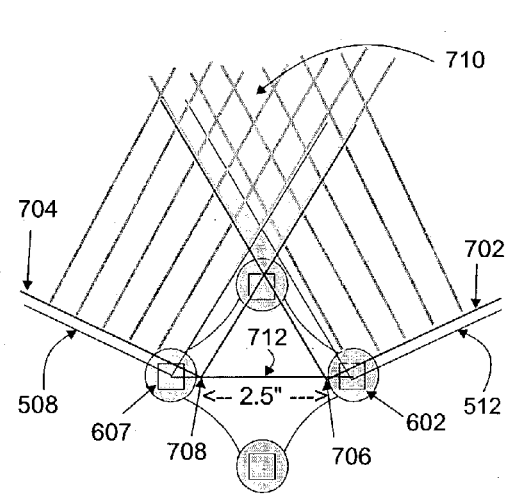

FIG. 7a shows a top-down view of the geometry of the example 4-pair camera head and the fields-of-view associated with the component imager sub-systems. To maintain normal stereoscopic perception, it is useful to create virtual views from the diagonal imagers. These imagers are separated by 3.5", the diagonal measurement of a square with 2.5" sides. The two newly generated views are perceived to be 0.5" closer to the opposing imager along the imaginary line 712 that connects the two imagers and runs through the geometric center of the imager plane. Two separate interpolation processors operate in parallel to generate the left-eye and right-eye views at an apparent 2.5" separation to facilitate real-time display of video data with negligible lag.

These interpolation processes can be performed in hardware, software, firmware or combinations thereof. The process operates on the calibrated decompressed video streams, which are available on a free-running basis throughout the processing section or computer as video moves through the system. From these streams, right-eye and left-eye virtual views are created by applying a spatial weighting of pixel data. Imager 2 FOV 512 and imager 7 FOV 508 are the actual fields-of-view captured electronically. Starting with gen-locked images to ensure that moving objects in coincident FOV are in sync in the imagers, interpolated views 2' 702 and 7' 704 are created at an apparent 2.5" separation distance by the real-time interpolation of the original imager 7 and imager 2 images. The virtual views are set to nodal points 706 and 708 respectively that match the normal interocular distance.

Specifically, for a right-eye interpolated 2' view 702, the image data from the right-eye imager 2 602 is given a positional priority of 86%, while the left-eye imager data from the left imager 7 607 is given a 14% positional priority. This presents an interpolated right-eye view 702 that appears to be $1/7^{th}$ of the way from the right-eye imager 602 along the imaginary centerline 712. ($1/7^{th}$ of 3.5" is 0.5", the correct location for the right-eye interpolated view.) The identical process takes place to establish a left-eye interpolated view 704. Thus, the resultant interpolated stereoscopic FOV 710 appears as normal to a person viewing through image reproduction equipment. The same methodology applies to the other opposite-side imager views when constructing a normal interocular separation distance stereoscopic field view, and combines with other standard stereoscopic views to create a full 360° panorama in stereo view with no moving parts.

There are several types of interpolation that may be employed, examples of which are nearest neighbor, bilinear, bicubic, and fractal. Similarly, interpolation can be accomplished through any one or combination of various means such as ASICs, discrete logic, DSPs, or code on the host processor. The important point is that the two virtual views are spatially weighted based on which eye the view is being constructed for and that the processes take place in real time without inhibiting the video flow to introduce time lags.

Another important feature of this design is the dynamic nature of the interpolation engine, the value of which is illustrated through the description of a physical phenomenon. When a person keeps his/her head stationary and looks at an object, which is at a few feet straight ahead, he/she achieves the maximum stereopsis effect. In other words, his/her eyes are separated by the maximum amount as if they are naturally looking at the object. For objects visible to both eyes, but at the right or left extremes of a visual field, if this person does not turn his head, although the eyes point directly at the object, there is decreased separation distance between them because of the convergence angle displacement. This results in a decrease in stereopsis that is normally not noted by the individual because it is coupled with the psycho-perceptive cues associated with the eyes being rotated to the far right or left. Through the formative years, the brain adapts to the effect and does not expect the same depth as when looking straightforward. A problem is introduced when using a stereo viewing system, since the biological cues for rotated eyes are not present while the individual is looking straightforward. The problem exists because while the viewing window may be electronically rotated on the display, the positions of the imagers are fixed and are not moving; thus, the effective interocular separation distance changes with the convergence angle displacement.

However, there is a feature of the interpolation engine design, which compensates for this effect. By knowing the location of the object of interest (which has been selected by the user or an automated process) relative to the imager pair, the angular displacement of the convergence angle from center is known. A simple calculation yields the weighting factor numbers that should be put into the interpolation engines to retain the effective 2.5" interocular separation distance. This method therefore provides a consistent effective 2.5" interocular separation distance for the entire FOV for interpolated pairs. At the overlap point, where one changes from interpolated views to standard stereo views, the views are by definition locked in to 2.5". Due to the smaller FOV for standard pairs (based on their offset angles reducing the stereoscopic FOV), the decrease in stereopsis is minimal as objects move from center to displaced convergence angles. This invention therefore provides for a maximal stereoscopic effect for almost the entire 360° FOV, a feature that is only available on motorized stereoscopic PTZ systems (which cannot capture, record or display the entire 360° panorama at one time at all).

Figure 7B:
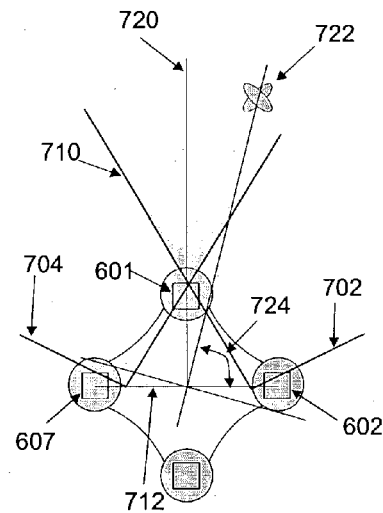
FIG. 7b illustrates the effect of off-axis object location and the impact on interpolation processes.

Referring now to FIG. 7b, the visual effect of this 2.5" separation measurement is absolutely normal for viewpoints on or practically next to the orthogonal centerline 720 that lies directly between imagers 2 602 and 7 607. However, for views of objects off the physical center axis 720, there is reduced stereopsis due to the reduced convergence angle 724 (less than 90°). Object 722 is an example of an object that is near the edge of the interpolated stereoscopic viewing region 710 for this pair of views. The smaller convergence angle reduces the apparent separation distance from 2.5", the interpolated separation distance. Ordinarily, this effect would become more pronounced as objects move generally lower toward the line 712 between the imagers 602 and 607.

However, this effect is mitigated by the present invention, since objects moving out of the interpolated stereo FOV 710 are rather viewed by using a standard stereo view (610 in FIG. 6a, but not shown in FIG. 7). Nonetheless, since people viewing the objects will potentially center the display on these objects, a noticeable change in stereopsis could occur as objects move off-axis from the orthogonal centerline 720 of the stationary imagers. Toward that end, it is therefore a valuable and important aspect of this invention that the interpolation parameters can be modified dynamically to more closely approximate normal interocular separation distances to correspond with objects centered in the window selected by the user for displaying on the stereoscopic display device.

In practice, as objects move off-center (as indicated by the user adjusting his view to keep the object centered in the display), the interpolated stereo views move closer to the actual acquired views from the physical locations of the imagers. For objects on the boundary between interpolated and standard stereoscopic FOV, the views acquired from imager 1 601 and imager 7 607, both left-eye views, are very similar other than minor differences in magnification, which should be negligible except for very near-field objects. This process therefore maintains virtually a constant interocular separation distance between imager views and has a smoothing effect when changing between stereo views of adjacent pairs. An example of such a change is when going from the combination of imager 7' FOV 704 and imager 2' FOV 702 to the combination of imager 1 FOV 502 and imager 2 FOV 512. This approximates the effect of turning the head to view objects, as opposed to just turning one's eyes, and produces a more realistic viewing effect since the user is looking straight ahead at the detail monitor.

A secondary effect of using diagonally displaced imagers to create stereo views is the differing apparent distances from actual imagers (mirrors) to objects in the FOV between standard and interpolated pairs. The combination of imagers 1 and 2 to form a standard stereoscopic view is centered 1.25" from the center of the camera head, while the interpolated combination of imager 7'+imager 2' has its center on the center point of the camera head. Since most objects will be orders of magnitude away from the camera head relative to this distance this effect is negligible, and need not be corrected for.

Since imager sub-systems are relatively inexpensive, it should be apparent that embodiments with 5 or 6 pairs of imager sub-systems instead of 4 pairs support increased resolution without dramatically affecting cost. Using the representative current generation of imager sub-systems employed in consumer/professional cameras with resolutions of 2000×2000 pixels, for example, the stereo resolution increases from a uniform 8000×2000 pixels with 4 imager pairs to 12,000×2000 with 6 imager pairs. In comparison, a single such 4 Mpixel sensor in typical parabolic mirror configurations (circular view projected onto a 2K×2K pixel array) yields a resolution of 3454×900 pixels. In addition to lower resolution, these pixels are distributed non-uniformly (more pixels at either top or bottom of image), and adding additional imaging sensors is not feasible.

Therefore, the only solution available to parabolic mirror purveyors is to use the more expensive highest-resolution imagers to achieve high-resolution coverage. The present invention yields a uniform stereoscopic 21.1 pixels/degree for a 4-pair embodiment versus a non-uniform monoscopic 9.6 pixels/degree for parabolic methods, approximately a 220% improvement in usable uniform resolution through the methods of the present invention.

It is advantageous to look at processes involved in the acquisition and presentation of stereoscopic images according to the present invention. The display processing includes two major components: a panoramic control display process; and a stereoscopic display process. The panoramic control display process provides the main user interface and manages several control functions. These functions include stereo view (or detail) window selection through a mouse, a touch-screen interface, another device or automated process; processes for analyses of interest such as distance, direction, and visual filtering; and user controls and view selections. The panoramic control display process takes the collection of gen-locked video signals and integrates them into a seamless whole.

Figure 8A:
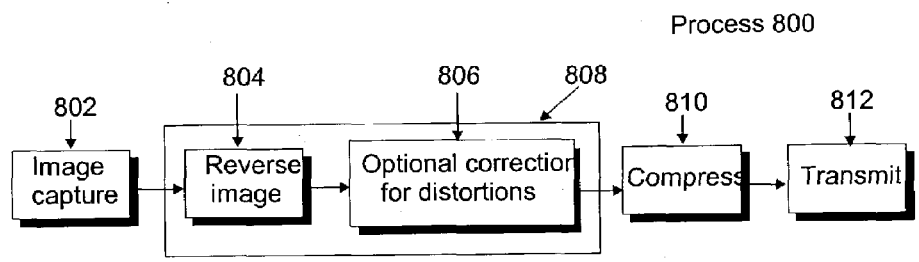
FIGS. 8a–8c respectively illustrate the standard image capture process, the process for generation of a panoramic image for a control display, and the process for generation of stereoscopic video.

FIG. 8a shows the data flow for the capture of video information in a camera head. Images are ordinarily captured, at step 802, by an imaging sensor or similar apparatus, and this occurs for each imaging sensor in the camera head on a synchronized (gen-locked) basis. Based on the use of reflective elements in the optical path, the image is reversed at step 804 before eventual use, followed by distortion correction, at step 806, as needed. Distortions may be introduced optically to achieve larger FOV coverage or accidentally through flaws in optical components or other cause.

In general, subsections of the total image are acquired as piecewise-planar sections of a cylindrical or spherical whole that have been distorted due to optics. Distortion correction may therefore include cylindrical-to-planar or spherical-to-planar conversions as well as optics corrections. These conversions are reasonably done for each pixel in the array on a line-by-line (or possibly bilinear or frame-by-frame) basis as the video data is being serialized for compression prior to transmission. Since these distortion corrections and the reversal process are conventional, the constituent calculations may be combined into a single process step 808 in real time so that there is no delay or computational overhead in the image acquisition stage. The specific values for correction formulae depend on the parameters of the optical and imaging components used. Since this is based on customer requirements, it is not specified uniquely. The image is then compressed at step 810 by effective real-time means and then transmitted at step 812 using transmission components media. The video streams from several imaging sub-systems may be combined optionally for more efficient use of components.

Depending on the resolution available on the monitor used for displaying the full-field view, the output of either set (right eye or left eye) of 4 imagers is sub-sampled to display a reduced-resolution collection of video streams. The purpose of this is to: manage control of analyses; report distance and other information; and allow selection of the window that is to be shown on the stereoscopic display. The stereo display is either an autostereoscopic flat panel, polarized/multiplexed glasses, HMD, or any other commercially available stereoscopic viewing device.

This head configuration has the further advantages of a fail-soft operation. Specifically, if one or more camera sub-systems, transceivers, or processing units fails during stereoscopic operation, the system can compensate and continue operation. One such result might be that the system drops into monoscopic mode by using only one board's input while still retaining its targeting and viewing capabilities (but with reduced ranging). Alternatively, a combination of imager outputs can maintain a full panoramic view.

Figure 8B:
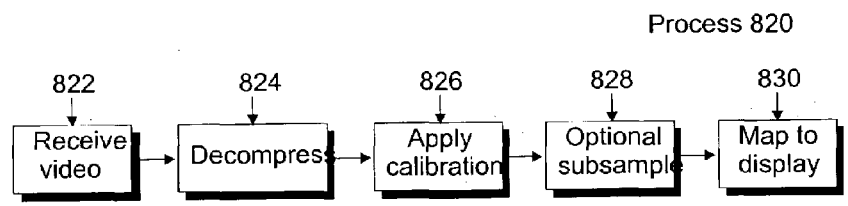

FIG. 8b shows the data flow process 820 involved in preparing the video streams for monoscopic panoramic display. The video streams are received at step 822 and are decompressed at step 824 on-the-fly. At step 826, any necessary electronic calibration adjustments for relative positioning are made as part of placing the pixels in a panoramic display buffer. When the system is initially manufactured, overlaps between imagers are noted and stored with the system to simplify alignment of image edges. These adjustments are made during the construction of the images by slightly altering placement of pixels as needed, and this takes place as a single operation with the construction of the image maps. Depending on the resolution of the panoramic control monitor and customer format preferences, subsampling step 828 is optionally applied to the video streams prior to the mapping to the display buffer, at step 830, to facilitate getting the whole 360° FOV on the screen at one time.

The stereoscopic display process is similar to the panoramic display process, but is operative on only a subset of the video streams at a time. Consequently, as a matter of efficiency, only two interpolation processors are necessary for stereoscopic display for an individual user. It is further designed to supply these selective subsets to two separate display buffers, one for the view for each eye. The stereoscopic display processes (one for each eye) handle stereo output and include: view selection control from appropriate video streams based on user selection or pre-programmed parameters; interpolation engines; convergence angle correction; and interfaces to various stereo viewing devices. View selection is accomplished through standard devices and mechanisms characteristic of PC-based systems. Images on the monitor can be selected on the monoscopic panoramic monitor for detailed or stereoscopic viewing (if that type of monitor is attached) by any number of typical methods for selecting objects on a computer display. Such techniques include drawing rectangles around the objects on screen and double-clicking on objects to initiate edge-detection highlighting.

Figure 8C:
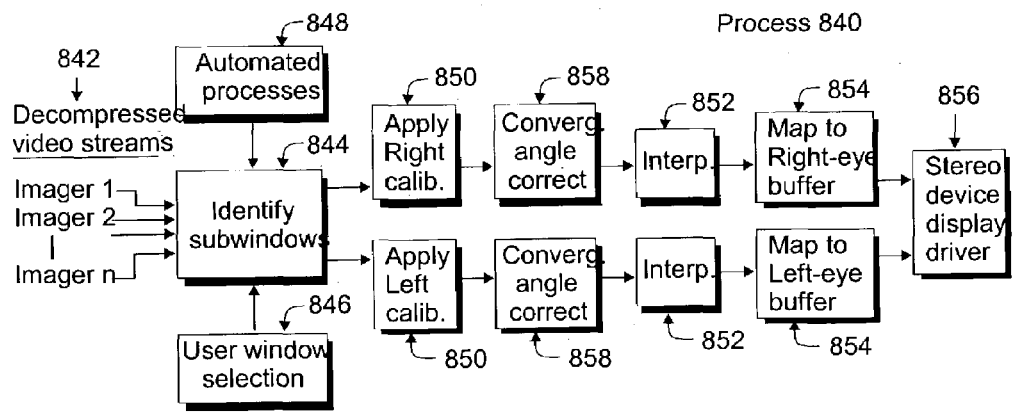

Continuing with processes in FIG. 8c, the stereoscopic display process 840 starts with the decompressed video streams at step 842, and identifies the portions of the left-eye and right-eye windows, at step 844, that need to be constructed from each video stream. The selection is based upon the stereo/detail viewing window selected by the user at step 846, or by user-spawned automated processes, at step 848. For those portions of the stereo/detail viewing window that come from an imager pair separated by the normal interocular distance ("standard" stereo windows), the next step 850 includes applying calibration factors to the selected stream data. This calibration step is the fine adjustment of boundary edges of each subwindow, if the subwindow exceeds the input of an imager sub-system (overlaps with another subwindow). This step also allows for minor adjustments that are desirable to compensate for component drift, temperature effects on equipment, and so on.

The next step 858 includes correcting convergence angle, which compensates for off-axis positions of objects in terms of apparent interocular separation distances. For those portions of the stereo/detail viewing window that originate from diagonally-disposed imagers (in our 4-pair configuration), the views are first interpolated at step 852 to establish interpolated viewpoints at the appropriate interocular-separated locations before mapping, at step 854, to the appropriate right-eye and left-eye display buffers. This interpolation step is only performed on the limited portions of the selected display windows that fall within the interpolated stereo view regions; so, this step can be done with minimal delay of the video signals. The application of calibration factors, at step 850, is preferably combined from a computation standpoint with convergence angle correction, at step 858, and interpolation, at step 852, to improve throughput and to reduce latency.

This architecture is designed to allow images to be handled either as in-line processes (in the same code stream as window selection, distortion correction, and interpolation) or through parallel processed analysis engines by making all video streams available in the display processor unit separately. It also allows optimization with current components, as well as growth as new techniques evolve. Fiber-optic connections are appropriate, but not essential, to convey video signals from the remote camera head to the display processor. Furthermore, these standard digital video streams are suitable for compression.

Distance determination is accomplished through analysis of the stereoscopic image data without external sensors, although these may be used in conjunction with the design without limitation. However, some markets require non-intrusive sensing, and this can be done with passive stereo ranging.

Figure 9A:
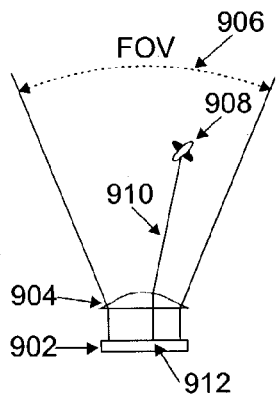
FIGS. 9a–9d illustrate the triangulation technique and process for distance measurement.
Figure 9B:
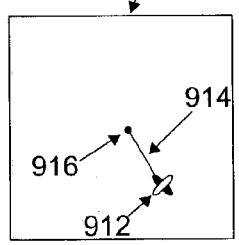
Figure 9C:
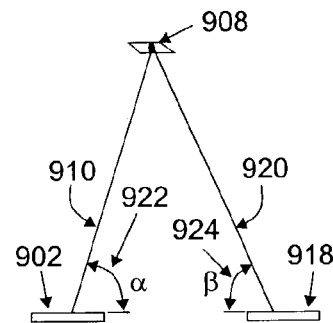

An example technique, as illustrated in FIGS. 9a–9c, relies on the triangulation of points on objects in the visual space from the fixed relative positions of the imager subsystems. An image sensor 902 is illustrated in an edge-wise orientation in FIG. 9a. In operation, a lens 904 is used in front of it to establish a field-of-view 906. An object 908 in the FOV 906 traces a ray 910 optically to a location 912 on the object plane of the surface of the imager 902. In the surface view of the imager's 902 object plane (as shown in FIG. 9b), the distance 914 from a center point of the array 916 to the object's projection point on the imager surface 912 corresponds to and traces the line (ray 910 of FIG. 9a) to the object 908. Since the optical properties of the components are identified and positions are fixed, there is a 1:1 correspondence of ray tracings from the imager surface 902, through the lens 904, to positions in the visible environment. The individual pixels in the imager 902 array map lines from the surface based on positions of objects in the visible space in front of the imager 902 and lens 904. Two coplanar imagers 902 and 918 each map their respective rays 910 and 920 to the object 908. In doing so, the ray 910 forms an angle of incidence α 922 with the imager 902.

Similarly, ray 920 forms an angle of incidence β 924 with imager 918. Each of these lines has the standard linear formula $y=mx+b$ for values in an XY coordinate system, where b is an offset number. Considering the simplest case in which the object 908 lies on a plane perpendicular to the surface of imagers 902 and 918 and setting the offsets to zero, there is a unique value for x and y where the two rays 910 and 920 intersect. Solving for this value with the two simultaneous linear equations supplies the distance from either imager to the object in a first perpendicular plane, given a known angle of incidence.

Having thus solved for the location of the object in one plane perpendicular to the plane of the imagers, the same type of calculation can be done again in the second plane perpendicular to the imager plane using the second angle derived from the object's project position 912 on the imager 902 surface (from FIG. 9b). Combining the results from these equations completes the definition of a vector quantity that defines the location of object 908 in the 3-dimensional space in front of the imagers and the distance from the imagers to the object. This description is explanatory and may be calculated through combined equations or more efficient calculations in actual practice. However, triangulation is one preferred general method employed to determine distance information.

Figure 9D:
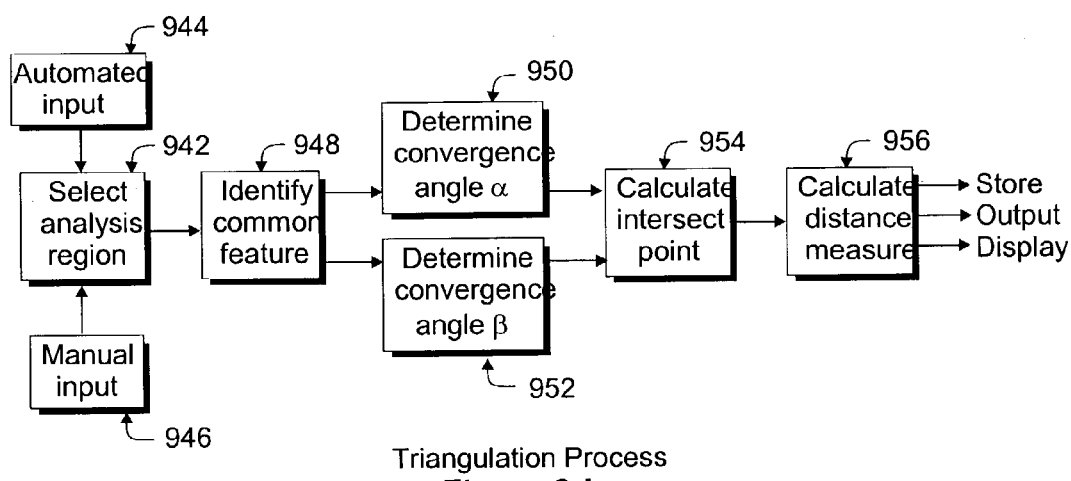

FIG. 9d shows the process 940 associated with the triangulation method described. An analysis region is selected, at step 942, in which there is a point with measurable differentiation from its background, such that it is uniquely identified in views by both imagers. The analysis region may be of any arbitrary size, and the number of regions depends on how many distance measurement points are desired by the user or analytical process. The region is selected by an automated process step 944 or by manual input from a user at step 946, and a common feature is identified, at step 948, in the analysis region for the triangulation process. This common feature may be differentiated on the basis of color patterns, luminance transitions, geometric features or other characteristics on a single-line or multi-line basis, which is most computationally efficient and effective. Once a point has been identified, the convergence angle α is determined, at step 950, for the first imager 902.

Next, the convergence angle β is determined, at step 952, for imager 918, using imager identifications from FIG. 9c. The convergence angle correlation described earlier is either dynamically calculated, or determined by use of lookup tables, or any by other methods. The point of intersection is then mathematically calculated at step 954, which results in a distance determination, at step 956. The value determined can be stored, output to secondary processes for creation of a 3D volume map, displayed in a numerical form to the user, or used in other treatments of the data.

There are practical shortcomings in the point selection process using luminance as the identifying characteristic that could yield errors. Ideally, the target point would have high contrast with its background, be parallel to the imager surfaces and have no thickness. Realistically, since this is not the case in all visual circumstances, variations in data may arise. So, the point selection process collects data rapidly and on an ongoing basis, then, applies temporal averaging to this data. This eliminates occasional data points that fall too far out of expected values. This process establishes a consistent number which, when calibrated initially during the manufacturing process, gives high reliability in distance measurement values.

Figure 10:
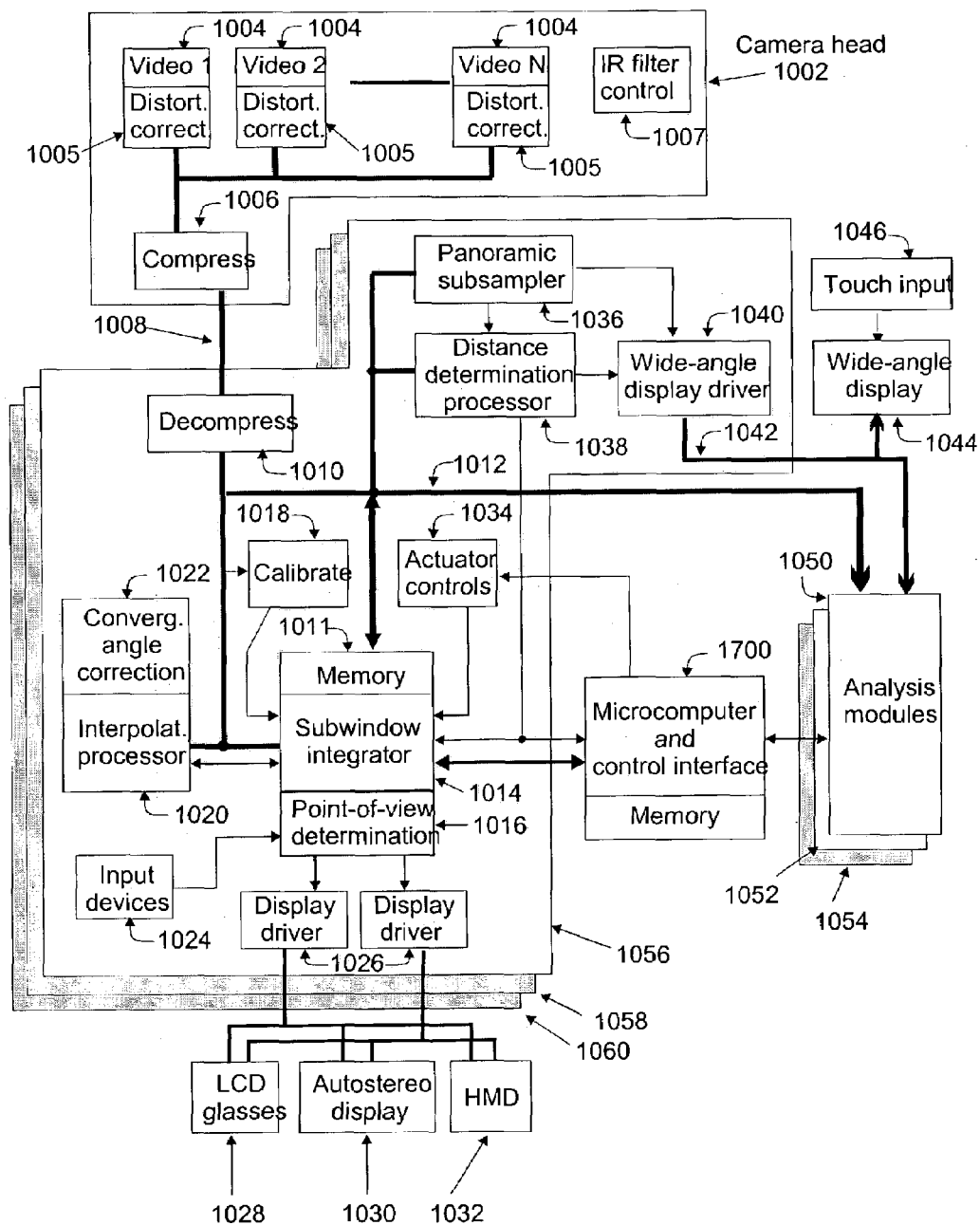
FIG. 10 is a functional block diagram of the stereoscopic panoramic imaging system.

The architecture for this system is functionally diagrammed in FIG. 10. This diagram is suitable for the previously described full stereoscopic imaging system embodiment and for the monoscopic embodiment, which will be described later. There are four main functional divisions: the camera head 1002; the stereoscopic display processing sub-system 1056; analytical modules 1050, 1052, and 1054; and an accessory microcomputer system 1700.

Referring to the camera head 1002, there are multiple image sensor sub-systems 1004 that are contained therein. Each imaging sub-system 1004 has an optional distortion correction function 1005 that adjusts for any optical or component aberrations on the video stream and reverses the image (which is necessary due to the use of mirrors) before the streams proceed to a compression module 1006. This function is alternatively accomplished as part of the function of the calibration module 1018. The exact placement of this function in either the head or display processing sub-system is not critical. The important aspect of its function is that the function is done dynamically during the streaming of video and that it is done before integrating the subwindows.

In one embodiment, there is an IR filter control block 1007 that oversees positioning of IR filters in the optical path during daylight and removes them (for combined low-light/daylight models) when low light conditions exist. The IR filter block 1007 is not present in all embodiments of camera heads. When present, it is controlled alternatively by light sensors internal to the head, light level signals from the imagers 1004, or control signals from the microcomputer 1700 fed back over bi-directional cable 1008.

The combined and compressed video signals are conveyed from the remote camera head 1002, over a high-speed transmission medium 1008 such as a fiber-optic cable, to a decompression module 1010 that breaks out the individual video streams for distribution as a bus 1012 throughout the processing station. The video streams continuously fill and refresh frame memories 1011, which, inter alia, support various functions such as subwindow integration 1014 and panoramic subsampling 1036.

To prepare the collection of video stream data for stereoscopic presentation, a subwindow integrator 1014 combines the portions of the video streams that are appropriate as calculated by the point-of-view determination block 1016. The point-of-view of interest to the user is selected by manual input through input devices 1024 or is chosen through automated processes running on the microcomputer system 1700. A calibration module 1018 adjusts, as needed, for overlap regions between video streams, by selecting appropriate cutoffs to establish seamless boundaries based on mechanical measurements of individual camera heads and optional electronic calibration incorporated as an internal process.

For video stream data that originates from diagonally disposed imagers, interpolated views are dynamically constructed by the interpolation processes 1020. These processes use convergence angle corrections 1022, as appropriate, based on the off-axis position of the object of interest as determined by the display centering actions of the user.

Having constructed right-eye and left-eye views from the video streams, the subwindow integrator 1014 sends the signals to twin display drivers 1026 for stereoscopic presentation. The video streams are shown on LCD glasses 1028, an autostereoscopic display 1030, a head-mounted display (HMD) 1032, or other stereoscopic display device. It is an advantage of the present invention that the video stream bus 1012 is optionally distributed to multiple stereoscopic display processing sub-systems 1058 and 1060 to provide multiple independent viewing stations capable of selecting their own stereoscopic views of the 360° panorama as desired. Actuator controls 1034 are employed with the monoscopic embodiment of the system to steer the mirrors to selected areas of the panorama. The controls 1034 operate under user or program control to provide full 360° monoscopic viewing or less-than-360° FOV stereoscopic viewing with distance measurements as the user desires.

The panoramic subsampler 1036 reduces the video data set, as needed, to prepare a set of wide-angle monoscopic display signals for driving one or more wide-angle monoscopic control displays 1044 from the wide-angle video bus 1042. Optional touch input devices 1046 attached to the wide-angle display are used to select the detail or stereoscopic window as the user desires. The distance measurement processor 1038 uses the stereoscopic video data to determine distances to selected points or regions with the FOV and provides that information to the subwindow integrator 1014, the microcomputer system 1700, and to the wide-angle display driver 1040 for displaying on the various display devices. The wide-angle video bus 1042 also supplies the monoscopic panoramic control video information to the various analysis modules 1050, 1052, and 1054 for analyses of interest.

Figure 11:
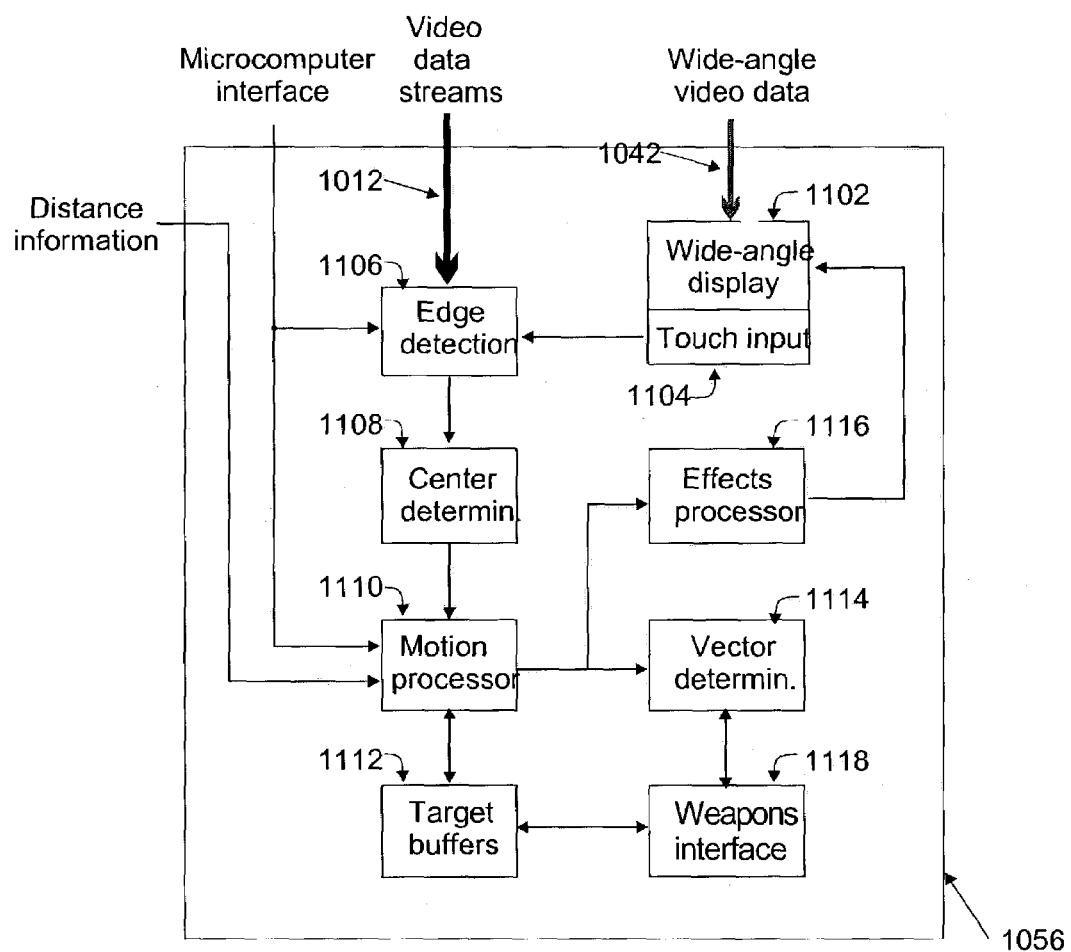
FIG. 11 is a functional block diagram of an exemplary embodiment of an analysis module for tracking moving objects.

FIG. 11 is a functional block diagram of an exemplary embodiment of the analytical module 1050, the function of which is to track moving objects within the FOV of the camera head 1002. The analytical processing sub-systems draw image data from the various individual imagers through the video stream bus 1012. Alternatively, they tap those streams at various places throughout the processing unit (e.g., pre- or post-calibration and pre- or post-interpolation) as might be deemed more effective for a given analysis.

One of the methods of selecting objects is through the optional touch input device 1104 attached to the wide-angle display 1102. Alternatively, automated processes select objects to be tracked through microcomputer control or external stimuli. The edges of the selected object are detected at step 1106, and a center region of the object is determined at step 1108 to make tracking easier. A motion processor 1110 then takes location and distance data over time to determine actual and predicted paths for the object. This information is optionally supplied to target buffers 1112, along with a vector determination module 1114, both of which feed an accessory camera or weapons interface 1118.

In addition, the edge and center information about the object being tracked is supplied to an effects processor 1116 for modifying the appearance of the object on the wide-angle display 1102. This is just one example of a technique for object tracking and is not meant to be exclusive or limiting. It should be clear to those skilled in the art that multiple additional analytical processes can be operated with their own individual viewing stations as desired. It should also be clear to those skilled in the art that the various functions can be accomplished through hardware, software running on a host processor or microcomputer, or various combinations of hardware and software. The final implementation is flexible and is determined according to design efficiencies, costs and customer requirements for size, power, and various other factors.

Along with the distance determination methods, other representative examples of visual analyses that are compatible with this design include, but are not limited to:

Object vector determinations for targeting

Construction of 3D volume maps

Object identification

Background suppression; movement highlighting

Zone emphasis, highlighting or exclusion.

It should also be apparent from inspection of the architecture that failure of individual imager sub-systems or other components does not make the system inoperable (although it may minimize stereoscopic FOV for parts of the panorama). The system maintains reporting functions from the various components that are monitored continuously, allowing software to automatically shift video streams as needed in the event of individual failures to maintain a full 360° panoramic view. This fail-soft feature is especially advantageous in surveillance situations where continued visibility is essential.

Some of the advantages of this design, in addition to high, uniform resolution and infinite depth of field, include:

Support for multiple independent stereoscopic viewing stations for telepresence and improved situational awareness (more eyes on a scene at one time capable of assessing conditions and directing action)

Support for multiple analyses running in parallel (since all video streams are present at the processing unit in at least one implementation)

Real-time distance measurement capability through passive stereo calculations

Reconfigurability of the design for either monoscopic or stereoscopic models (discussed in detail later)

Redundancy of coverage through stereo imagers that facilitates fail-soft operation Use of duplicate complex assemblies (image capture boards), improving manufacturing efficiencies Electronic recalibration capability of camera view overlap alignment, allowing the panorama to remain seamless despite changes over time or through changing temperature conditions.

Monoscopic Camera System Embodiment:

The design of this camera system is also amenable to a camera head with a predominantly monoscopic configuration of components, which can be produced at lower cost while still having many of the features of the full stereoscopic model. Further, FIG. 10 is a representative block diagram for this embodiment of the camera system as well as the stereoscopic embodiment.

Figure 12A:
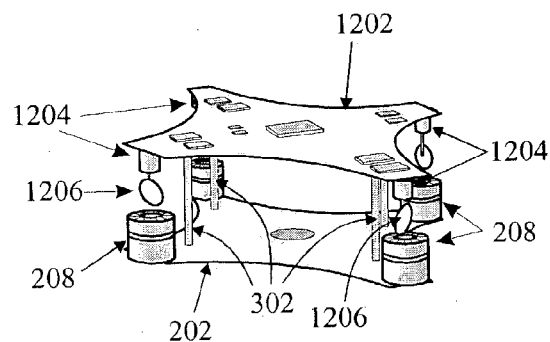

In this camera head embodiment, a mirror actuator board 1202 replaces the upper capture board (the other capture board 202 remains) and contains mechanical sub-systems for redirecting the optical path, as is shown in the isometric drawing of FIG. 12. A 4-imager system is used for description, but as with the full stereoscopic embodiments, more imagers could be employed. Mirrors 1206 are connected by vertical supports 308 to the actuators 1204 such as stepper motors, solenoids or other actuating devices on the upper board 1202, so that they can be momentarily or more permanently pivoted to capture two views of objects in the visual space around the camera head. However, at all times, they focus on the external environment through the lenses 208 down to the imagers on the capture board 202. As with the other design, the vertical supports 308 may instead be a larger volume support structure that also contributes to shock absorption or other functions.

Figure 12B:
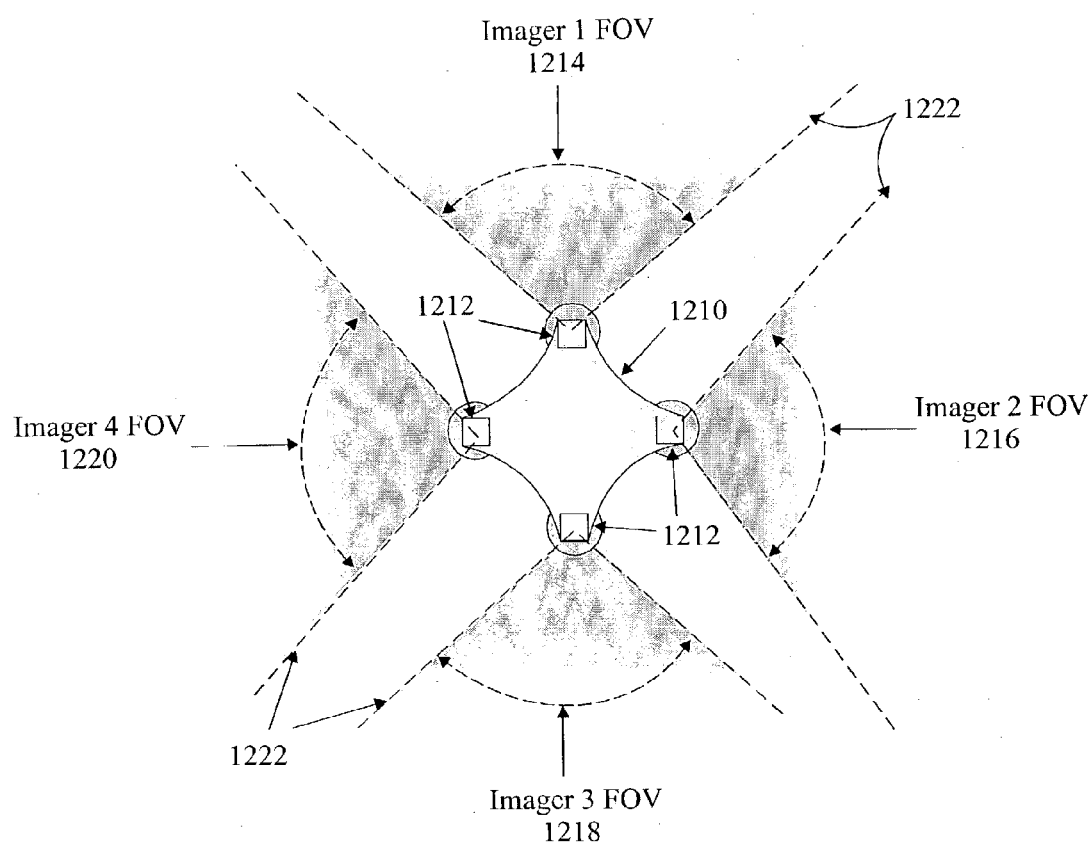
FIG. 12b is an illustration of fields-of-view for each imager.

Referring now to FIG. 12*b*, the mirrors 1206 are oriented to view out from the center of the board rather than obliquely. As with the standard stereoscopic model, the optical sub-system 1212 covers a FOV 1214, 1216, 1218, and 1220 that is arbitrarily 95°, bounded by FOV coverage lines 1222. This provides an arbitrary 2.5° overlap at the edge of each imager's FOV. For comparison, the stereoscopic model has mirrors angled so as to construct individual superimposed right-eye and left-eye video data sets. At the normal separation distances defined for the 4-pair camera head (2.5" between imagers around the square; 3.5" diagonally) with 95° FOV coverage, the monoscopic camera head embodiment captures all objects located at least 26" out from the center point and beyond. Anything within this distance has the potential for being in a blind spot.

This arrangement of mirrors captures full stereoscopic views of individual (or potentially multiple) objects for limited FOV, and establishes conditions for distance measurement. With this embodiment and motion detection or user direction-of-view selection, for instance, the mirrors are pivoted to track an object through the visual space stereoscopically. As shown in FIG. 10, the user selects a preferred direction of view, and point-of-view determination processing elements direct control of individual reflective elements. The interpolation processors described earlier are used when views from any two imagers do not present a large enough interocular separation distance so as to provide effective stereoscopy, as well as for views from imaging sub-systems spaced at extrapupillary separation distances. In such cases, the interpolation processors normalize the extrapupillary separated views to average intrapupillary separation distances. Since all areas of the 360° FOV can be captured stereoscopically (although not all at the same time), the distances to all objects in these spaces are accurately determined through the same stereo triangulation methods used with the previously defined stereoscopic model. With given spatial measurements for stationary objects in an environment, monoscopic estimating techniques for distance determination supplemental actual stereoscopic triangulation measurements for a high level of overall accuracy.

Further, in times of little activity or when first installing a monoscopic camera system, the mirrors are pivoted for mapping distances to all visible immobile structures in the environment, thereby simplifying the task of making measurements during actual tracking. This allows either manual or automated selection of objects and a variety of control methods for directing mirror movements.

An alternative to active tracking includes the use of occasional mirror pivots to do momentary stereoscopic captures for distance measurement or tracking. Since movements are so small, ranging image capture can be accomplished with only sub-second interruption to the wide FOV display. These ranging events can be programmed for manual control, automatic intervals, tracking moving objects, 3D scene construction, or other stimuli. Replacement of the upper capture board with an actuator board reduces communications requirements, simplifies the processing units, and makes the stereoscopic display (or HMD) optional while still providing stereoscopic capture and true distance measuring. This results in reduced cost and purchase prices. The tradeoff is the addition of motorized or actuator components with their associated wear conditions, power consumption, time lags, and control functions, as well as the reduction of full-time monoscopic coverage of the FOV. When using the stereoscopic mode for distance measuring or viewing, the full 360° monoscopic FOV is not viewable.

The monoscopic embodiment of the camera uses the same camera head cover, lower imager board, cables, and distance measuring techniques. In one embodiment, the processing unit is reduced in size and/or scope as desired, since it is handling fewer imager sub-systems while adding actuator control functions. The functional block diagram of FIG. 10 represents the architecture of the monoscopic embodiment, in addition to the stereoscopic embodiment.

Adjustable-Range Stereoscopic Camera System Embodiment:

Another embodiment of the present invention utilizes imaging components that are re-positioned during operation to provide differing stereoscopic depth ranges. In essence, existing imaging sub-system positions are extended or retracted along radial lines from the center of the camera head. This allows the user to modify the effective stereo viewing range of the camera system based upon the distance of objects of interest in the visual environment, to amplify or minimize the effects of hyper-stereo viewing. The technique is equally applicable to both stereoscopic and monoscopic camera head embodiments.

The range of stereoscopic viewing with imagers placed at normal interpupillary separation distances (about 2.5") is up to 300 feet. In hyper-stereo viewing, objects can be viewed with depth cues beyond the 300-foot range by increasing the separation distance between imaging sub-systems. However, to the untrained eye, objects viewed in hyper-stereo appear smaller than they ordinarily would by a factor proportional to the percentage increase in imager separation distance. With accommodation, though, there are advantages to 3-dimensional viewing at extended distances, as well as extended viability for distance measuring capabilities.

In this embodiment, any of several different drive mechanisms may be employed to move complementary imagers and their associated mirrors in and out synchronously and symmetrically. For example, FIG. 13a illustrates a ring-and-slide mechanism. Looking at a top-down view of a capture board 1302 designed according to the principles of the present invention, board extension arms 1304 contain slide channels that allow radial movement of the imaging sub-system 1306 in and out from the center of the camera head. The mechanism is designed in such a way that complementary (opposing) pairs of imager sub-systems on both capture boards move in and out on the slides in synchronism. Opposing imager assemblies are obscured in this illustration and are therefore not shown. The imaging sub-systems 1306 are attached to an extension arm 1310 by a pin 1314 that freely rotates. The other end of arm 1310 is attached by another freely rotating pin 1312 to a ring 1316 that in turn is rotated around a central point 1308 by a controlled motorized device (not shown). Counter-clockwise rotation moves the opposing imager pairs out, while clockwise rotation moves the pairs back in along their slides.

The different imager separation distances change the effective stereoscopic viewing ranges for the camera system. The visual output for this system is then either viewed in native hyper-stereoscopic video or in normal stereoscopic views with reduced stereo viewing because of the limitations of stereopsis at increased ranges. In both cases, distance measurements may still be made with the imager assemblies at their full extensions for improved accuracy.

FIG. 13b illustrates an alternate embodiment of a drive mechanism. In this embodiment, movement is accomplished by a central pinion gear 1320, the shaft of which is perpendicular to the plane of the imager board 1302. A non-illustrated controlled motorized device is present behind the capture board. A gear of matching tooth pattern 1322 is fixedly attached to a threaded shaft 1324. The shaft 1324 is supported for free rotation about its axis and is in turn attached to a threaded member fixedly attached to the imager/lens/mirror assembly 1306. Rotation of the central gear 1320 turns the threaded shafts 1324 which causes the imager/lens/mirror assemblies 1306 to move in and out in their slide channels of the board extension arms 1304. Assemblies 1306 move in or out depending on the direction of gear rotation. As stated earlier, these are just two of many possible mechanisms that can accomplish precision extension and retraction movements for the imaging components.

The important aspects of this form of movement are:
All components move in or out uniformly (same distances at the same times);
Distances are known and transmitted to the processing unit to maintain calibrated distance measurements;
Hyper-stereo indicators are displayed so the user can adjust viewing expectations;
Head cover and lens windows are designed to accommodate changing dimensions; and
More power is supplied to the camera head to operate the actuators.

The adjustable-range embodiment advantageously allows the user to dynamically change the area of effective stereopsis, thereby making that range the best for viewing objects with full depth perception. This is especially useful in applications involving naval ship security zones, in which the area of surveillance may change with each port and harbor. Adjustment of the ranges is done by using the same basic components and the same basic architecture of the stereoscopic embodiment of FIG. 10. However, the difference is that there is an additional pair of interpolation engines in the stereo processing unit, since it potentially has to handle two sets of virtual view constructions simultaneously. This situation occurs when a user wants his/her stereo view to be corrected to the normal interocular separation distances for the imagers. It is noted that the range-adjustment concept is equally applicable to a 5-pair, a 6-pair and all other camera head configurations, while the systems use the same control display, stereo/detail window selection techniques, and analytical processes.

Player Unit Embodiment:

One of the more convenient ways to package video information is through a DVD, and MPEG2/4 is an effective way to compress that information. Notwithstanding the good compression ratios that are available with the technology, the challenge of shrinking two full 360° visual environments (stereoscopic video)—in high resolution—down to a size that can be managed on a single disc for real-time playback is still difficult for today's conventional technologies. It is therefore useful to construct a device for handling and synchronizing multiple image data sets on one or more DVD drives so that users can freely view a full panoramic or spherical environment in stereoscopic video and select the angles of view at their discretion. Alternatively, the sequence of image data displayed is determined from sequence data pre-recorded with image data on the recorded media or supplied through transmission means. This is accomplished with a player system coupled with a viewing device. This player unit is described with 2 DVD drives, but any portable medium and any number of drives is operable and consistent with the present invention.

A functional block diagram for such a player unit 1402 is shown in FIG. 14, which shows two drives, but is functional with a single drive and is readily architecturally expandable to additional drives or to alternative embodiments as needed for accommodating higher resolutions and wider fields-of-view. In this embodiment, a microcontroller 1404 provides the control functions in response to standard operational control inputs 1406 and POV selections 1408 made by the user. A track and frame synchronizer 1412 is driven by the microcontroller 1404 and matches the appropriate pre-normalized video frames, as they stream from the media in drive units 1414 and 1416, based on point-of-view (POV) determinations 1410. These determinations are driven either by a pre-recorded script fed back to the microcontroller 1404 or by manual input 1408.

Alternatively, pre-normalized stereoscopic video signals are transmitted by satellite, cable, the Internet or other medium, represented by external signal interfaces 1442 and 1444. The manual inputs 1408 are created through a user interface associated with a computer input device (through port connections), joystick, touchpad, mouse, or any number of head-tracking mechanisms associated with and connected to an HMD. Synchronized frames are sent to the frame buffers 1418 and 1420 before feeding display drivers 1422 and 1424 that in turn drive stereoscopic viewing devices 1434, 1436, and/or 1438. By tracking and streaming video faster than the required speed for presentation, which is a conventional technique used in portable CD players, the system builds additional frames in lookahead buffers 1426 and 1428 that assure a continuous stream of video frames through the frame buffers 1418 and 1420. The lookahead buffers 1426 and 1428 are optionally larger than normal display frames to accommodate manual changes to the view as selected by the user. The larger size allows the beginning of movement without delay while new frames are being constructed by the synchronizer 1412.

The playback system or player unit architecture also accommodates multiple independent viewers by addition of processing components that allow each user to control his/her own viewing direction. The components that are replicated for each additional user include at least one manual input device 1408, a separate track and frame synchronizer 1412, stereo decode direction control 1430, optional surround sound direction control 1432, with frame buffers 1418 and 1420, lookahead buffers 1426 and 1428, display drivers 1422 and 1424, and display devices.

Audio is also a critical part of immersive environments, and, thus two mechanisms are provided in the architecture. At a minimum, a stereo audio track is recorded on at least one disc and is directionally decoded 1430 and supplied to the user by either line-out connections or a headphone output. In addition, a set of 5-channel Surround Sound signals is optionally recorded on at least one disc. Using the POV determination, the mix on channels is redistributed by a Surround Sound direction controller 1432 based on where the user or script directs the view and thus the corresponding audio. The audio data set is supplied as output to a standard optional external Surround Sound system 1440 to match the direction of sounds with the viewing experience. Both types of audio signals are synchronized with the video both temporally and spatially.

Videoconferencing System Embodiment:

Another embodiment of this design is a videoconferencing system that provides stereoscopic 360° views and audio without moving parts from a central point on a table or conference room. The value of such a system lies in that:

- Visual representations of people are more natural when viewed stereoscopically. (One objective of videoconferencing is to give a close approximation to all participants in a conference actually meeting in person.)
- It optionally captures high-resolution video for all locations in the room.
- There are modes for automated changes in point-of-view for the transmitted scene (moving to individual speakers or whiteboards/flipcharts).
- The system is able to digitally zoom in on objects in the FOV under user control.
- There are no moving parts (for fast response to changes in point-of-view, increased reliability, reduced maintenance, and lower power consumption).
- The system optionally tracks people moving around the room without manual control of the process.
- It transmits either selected views or a full 360° FOV (under remote or local control).

The same basic architecture is employed with this embodiment of the invention as with others. As with other embodiments, this system is built in either stereoscopic or monoscopic embodiments to satisfy different market segments. Since there is only a limited volume of environment to be covered, however, a 4-pair camera model is one practical collection of imaging sub-systems for the camera head. As with other versions of this invention, more or less imagers are optionally used.

Figure 15A:
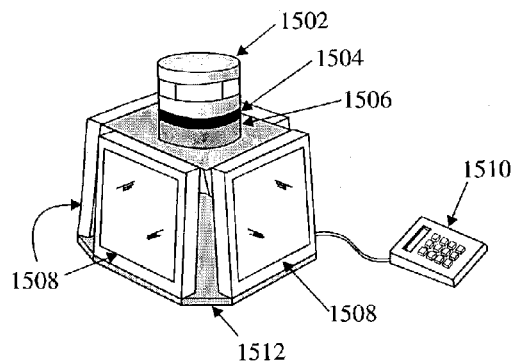

One embodiment of these components is shown in FIG. 15*a*, which shows the camera head 1502 at the top with the microphone array 1504 and speakers 1506 enclosed in the grill area immediately beneath it. Four autostereoscopic (or regular) LCD monitors 1508 are mounted on a swiveling/tilting platform 1512. Other than the configuration of the head itself and its placement toward the top of the unit for an unobstructed view and to be eye-level, placement of the various components is flexible. Many of the various pieces can be moved to different physical layouts and still perform their appropriate functions. A standard numerical pad 1510 is used for dialing, receiving and control functions.

In this embodiment, the FOV for all imagers is inclined slightly upward to allow use of the camera/mike head with or without displays. If displays are used, the camera-to-person directional angle is directly lateral. If the model with incorporated displays is not used and the camera head is sitting flat on a conference table surface, the mirrors are tilted somewhat upward to better capture the faces of participants sitting around the table. In any of these models, an increased vertical FOV can be established to accommodate people standing up as well as those sitting. This can be achieved through different mirror surface curvatures and lens combinations, as explained earlier. If incorporated displays are used, they are housed concentrically to the camera head support and on a rotating mechanism that allows the displays to be turned more directly to match a viewer's seating location.

The embodiment of the videoconferencing system follows the architecture of the basic stereoscopic panoramic video system and contains many of the core elements of the other embodiments, with variations based on the nature of conferencing.

Figure 15B:
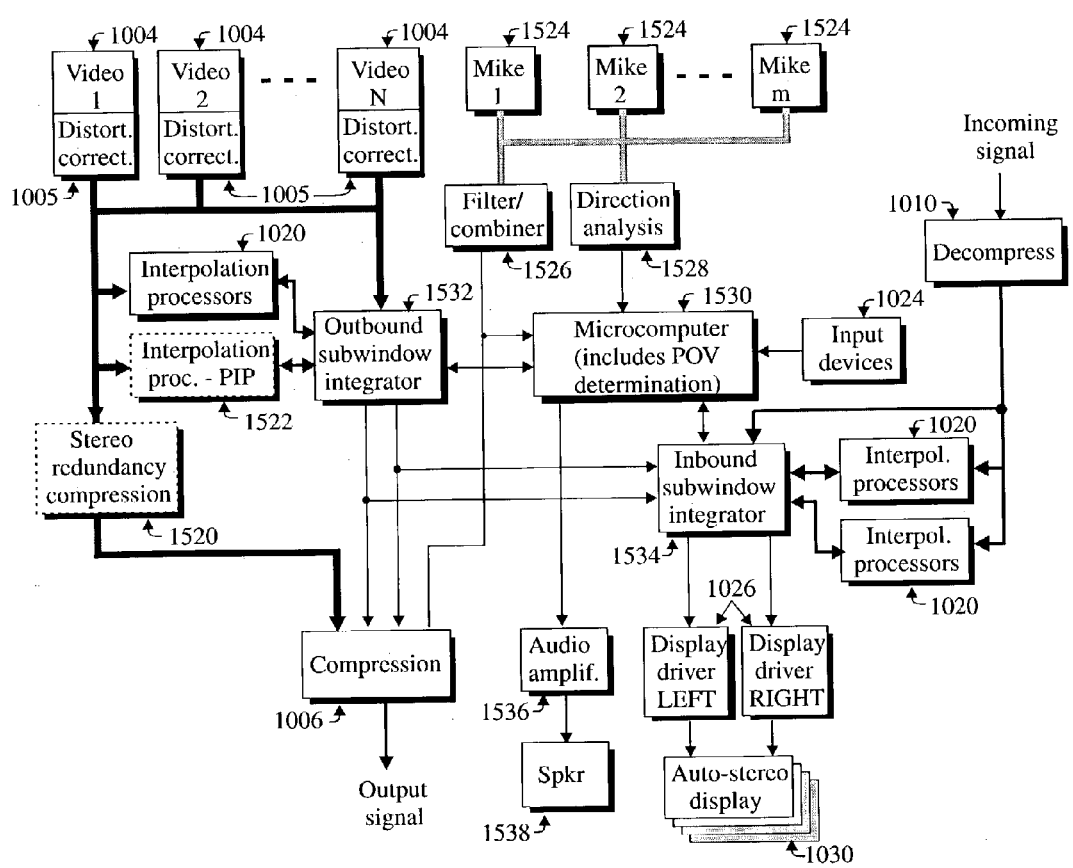
FIG. 15b is a functional block diagram of that implementation.

The functional block diagram shown in FIG. 15b defines a self-contained unit that is connected with other compatible units over standard communication channels to convey either stereoscopic or monoscopic video along with audio. A microcomputing device with its memory 1530 serves as the central control for the system, directing video flow and handling a variety of activities. Such activities include point-of-view determination, diagnostics, and potentially compression, direction analysis, and other practical functions. Video from the imagers 1004 is corrected for reversal and distortion at step 1005, after which it serves as a source to two processing streams. The first stream preferably analyzes each video frame for redundant stereo information, at step 1520, extracts duplicate material, then compresses it, at step 1006, to supply a full 360° FOV video signal for transmission.

In addition, the video from multiple imagers 1004 is combined in a subwindow integrator 1532 that creates a limited FOV in stereo, rather than a full panorama, which can be transmitted with lower bandwidth. The system dynamically responds to changing line conditions, adjusting video resolution or coverage to compensate for changes in available bandwidth. Interpolation processors 1020 create the appropriate interocular separation views to establish the complete stereo panorama. An optional additional interpolation processor 1522 is used to create picture-in-picture subwindows for stereoscopic display. Optional stereo commonality compression performed (according to and potentially by block 1520) is also done on the stream before final compression to further reduce the size of this signal. The final compression step 1006 uses standard video compression techniques to minimize bandwidth requirements.

In "receive" mode, the microcomputing device 1530 takes the decompressed 1010 signal and splits it into video and audio components. If the incoming video portion of the stream is a single stereoscopic FOV (possibly including a PIP subwindow), the microcomputer 1530 simply splits out the left and right views to their respective display drivers 1026. If the incoming video portion is the combined video outputs of all imagers at the remote location, the microcomputer 1530 constructs views of choice through integrating subwindows 1534 from the various imagers 1004 by interpolating stereo views as needed. The physical unit is designed to accept one or more autostereoscopic displays 1030, as users prefer, mounted on a platform 1512 that can be rotated. An audio amplifier 1536 with volume control supplies signals to self-contained speakers 1538.

The audio capture mechanism in this system is a planar array 1504 of multiple microphones 1524. Using the difference in arrival times as well as amplitude characteristics of the voices, the direction of speaking-participants is determined in relation to the stationary camera head/mike array. A direction analysis module 1528 determines the direction of the participant speaking to help set the point-of-view to be transmitted.

Alternatively, input devices 1024 such as a mouse or a touch screen are used to manually set preferred viewing direction at the remote companion conferencing unit. The system is designed to compensate for echoes (in-room and remote) and voices reflected from walls and other surfaces by a filter/combiner module 1526. The module 1526 prepares the audio for compression 1006 and then transmission. With this information and depending on the mode the system is in, the video is automatically switched to each speaker in a conference as they are speaking. An optional feature combines audio tracking with image analysis (e.g., edge detection) to provide the capability to follow an identified speaker as the person moves around a conference room, even if that person is no longer speaking. Another mode of operation allows manual direction-control of the FOV from the receiving conference room.

Yet another mode of operation of this design is the capture and transmission of the entire 360° FOV, which allows multiple other parties to independently select whatever views of conference participants that they wish to view without being constrained to view just the person speaking. This is of value in conference circumstances where a writing or an overhead projection surface is important to some viewers, while the speaker or other participants may be interesting to others.

Another advantage in transmitting a full 360° FOV lies in the ability to create stereoscopic and/or multiple picture-in-picture (PIP) windows when viewing. This allows participants to see both speaker and focal items/whiteboards at the same time, a feature that is not available on any other conventional videoconferencing system. Each of the windows is optionally independently controlled (panned, tilted or zoomed) or resized at the user's discretion. A higher bandwidth communication channel is required to convey a full 360° video FOV in stereo views.

Improved Digital Zoom and Resolution by Inter-Pixel Alignment:

Another important feature of this invention involves creation of ultra-high-resolution composite images by alignment of imaging sensors and their respective optical components during the manufacturing process. This embodiment has a unique utility in stereoscopic acquisition, since two imagers cover the full FOV at all times. The technique is applicable to all image sensors of any given pixel density as long as all image sensors are identical for a given implementation.

Area image sensors are constructed as an array of light-sensitive elements, and the overall camera head design calls for multiple identical imaging sub-systems operating together to capture a stereoscopic version of an environment. Ordinarily, sensors are generally aligned to capture a central object in a scene in the same exact location on the surface of the two sensors. The difference in views produces a stereoscopic effect through parallax. However, a more precise alignment procedure allows even better resolution images without using higher priced image sensors, while still retaining the ability to produce stereoscopic images.

In this embodiment, two sensors covering one scene are aligned such that the rows and columns of light-sensing elements within one pixel array fall on the spaces between the rows and columns of the other array in terms of visual space covered. This involves alignment on a sub-pixel basis, which is possible with accurate test fields, miniature adjustment mechanisms, precise manufacturing procedures, and electronic calibration. The result yields a stereoscopic display according to the present invention, while also creating an interlaced data set at twice the resolution of an individual sensor array. Due to their physical separation, the imagers do not capture exactly the same views of all objects in the scene, but they supply critical inter-pixel detail information that allows the creation of highly accurate composite interpolated images. Each eye's image data set can therefore be constructed with real and interpolated data to establish a high-resolution one-to-one correspondence between the data sets for the two eyes.

Since the optical path includes a lens screwed in to a lens-support structure that is firmly attached to the circuit board onto which the imager array is soldered, there are several alignment variables. These include planar adjustment of the image sensor on the circuit board (or optical sub-system assemblies) and the position of mirrors. Due to the unique nature by which this system creates stereoscopic images (alternatively using side-by-side or opposite-side imagers), mutual alignment is important.

In one embodiment, all the rows and columns for the imagers of one eye's image data set are aligned with each other. Similarly, all the other eye's image sensors are set to the inter-pixel spaces, aligning each of them with the other imagers for that eye. This alignment can be accomplished by positioning each sensor individually, but that involves multiple steps: one for each mirror and each sensor, thus totaling 16 precise adjustments for a 4-pair stereoscopic camera head.

However, by using precision manufacturing processes to achieve repeatable positions on the same plane and in proper rotation relative to each other, the alignment process is reduced to four steps through fabricating the adjacent mirrors as a single assembly. Aligning each mirror assembly for its appropriate line capture and rotational offset (a given position that can be modified by fine adjustments) guarantees that the rows and columns for each eye's sensors always interleave. The result is higher resolution through improved interpolation. Although the term interleave is used to denote interleaving pixel data from one sensor with pixel data from another sensor. Stated differently the pixel locations of one image sensor "fall on" or are "aligned with" the inter-pixel spaces of the other sensor.

Figure 16A:
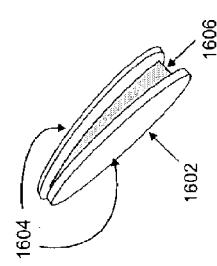
Figure 16B:
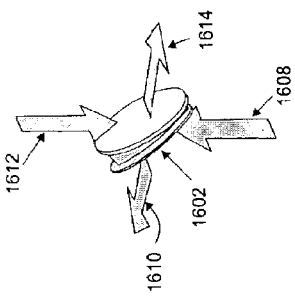

FIG. 16a shows one such mirror assembly 1602 that integrates two mirrors 1604, by joining them through a rigid bonding material or mechanism 1606 to precisely direct light. FIG. 16b shows the optical paths that are created using such an assembly. Path 1608 is the direction that the left-eye imager sees from its position on the lower board. This optical path continues after reflecting off one mirror of the mirror assembly 1602 in the direction of the scene to be viewed by the left eye 1610. By the same token, path 1612 is the direction that the right-eye imager sees from its position on the upper capture board. This optical path continues after reflecting off the other mirror of the mirror assembly 1602 in the direction of the scene to be viewed by the right eye 1614. With the ability to precisely align the mirror assembly 1602 with respect to the image capture boards and finely adjust their relative positions, it is possible to interleave the pixels from each imager array to combine the data through interpolative means to create two high-resolution views of a stereoscopic rendition.

Figure 16C:
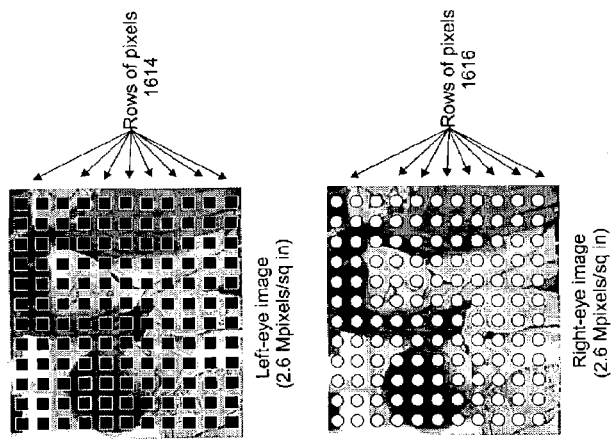
FIG. 16c shows a diagrammatic construction technique for generating such images.

Referring now to FIG. 16c, a representative left-eye imager is composed of many rows 1614 of light-sensing elements (i.e., pixels). Similarly, the representative right-eye imager is composed of many rows 1616 of similar pixels. The rows of left-eye pixels 1614 are illustrated as black squares, while the rows of right-eye pixels 1616 are illustrated as white circles. The inter-pixel data from rows 1616 are used to interpolate a higher resolution left-eye image to add to the left-eye pixel rows 1614. Similarly, the inter-pixel data drawn from rows 1614 is used to better interpolate a higher resolution right-eye image from the starting data from rows 1616. These two higher resolution data sets are then combined to produce a single high-resolution image 1618.

The value of higher-resolution images is also apparent in the process of digital zooming, which is interpolative in nature. Providing twice as many real data points from which to generate interpolated image maps effectively doubles the practical digital zoom extent for a given imager type.

In practical uses, the inter-pixel data from one sensor is preferably added to the image data from the other sensor when the scenes are analyzed or when increased resolution through digital zooming is done. This processing is done most appropriately in the analytical modules or display generation sections of the system. The alternative of constructing high-resolution views in the camera head increases the transmission burden. In both cases, the apparent resolution is doubled over a single-sensor output, while still providing stereoscopic views of the scene. This technique is most effective for objects in the far field, for which there is little difference between incident locations on the sensor surfaces.

Non-Limiting Hardware Embodiments:

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 17:
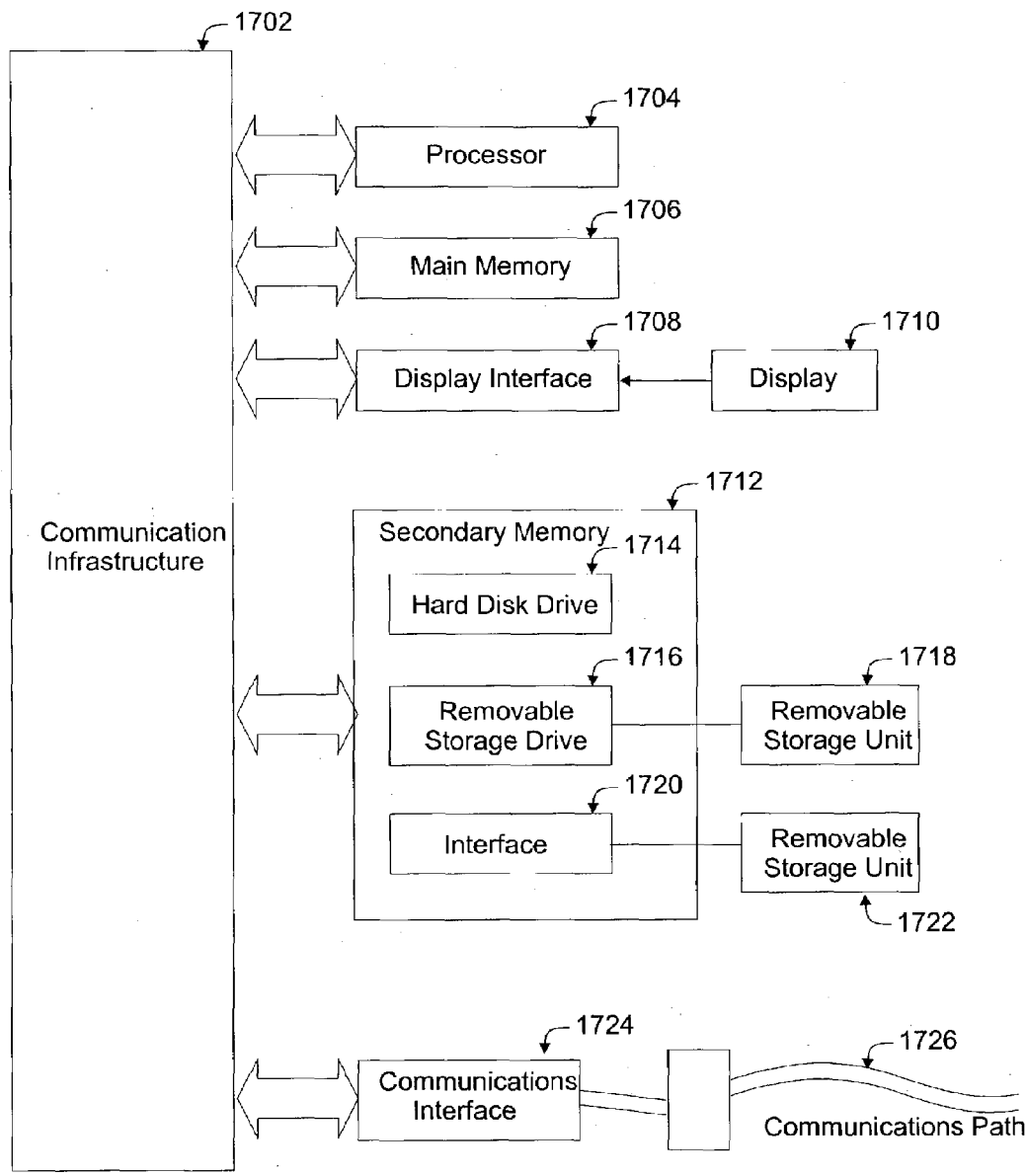
FIG. 17 is an exemplary embodiment of a computer system capable of performing the processing associated with the production, control, analysis, transmission and recording/playback of wide-FOV stereoscopic images or video data according to the present invention.

An example of a computer system 1700 is shown in FIG. 17. The computer system 1700 includes one or more processors, such as processor 1704. The processor 1704 is connected to a communication infrastructure 1702 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 1700 includes a display interface 1708 that forwards graphics, text, and other data from the communication infrastructure 1702 (or from a frame buffer not shown) for display on the display unit 1710. Computer system 1700 also includes a main memory 1706, preferably random access memory (RAM), and optionally includes a secondary memory 1712. The secondary memory 1712 includes, for example, a hard disk drive 1714 and/or a removable storage drive 1716, representing a floppy disk drive, a magnetic tape drive, an optical disk drive, etc. The removable storage drive 1716 reads from and/or writes to a removable storage unit 1718 in a manner well known to those having ordinary skill in the art. Removable storage unit 1718, represents a floppy disk, magnetic tape, optical disk, etc. which is read by and written to by removable storage drive 1716. As will be appreciated, the removable storage unit 1718 includes a computer usable storage medium having stored therein computer software and/or data.

In alternative embodiments, the secondary memory 1712 includes other similar means for allowing computer programs or other instructions to be loaded into computer system 1700. Such means include, for example, a removable storage unit 1722 and an interface 1720. Examples of such include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 also optionally includes a communications interface 1724. Communications interface 1724 allows software and data to be transferred between computer system 1700 and external devices. Examples of communications interface 1724 include a modem, a network interface (such as an Ethernet card), a communications port, a PCM-CIA slot and card, etc. Software and data transferred via communications interface 1724 are in the form of signals which may be, for example, electronic, electromagnetic, optical, or other signals capable of being received by communications interface 1724. These signals are provided to communications interface 1724 via a communications path (i.e., channel) 1726. This channel 1726 carries signals and is implemented using wire or cable, fiber optics, a phone line, a cellular phone link, an RF link, and/or other communications channels.

The terms "computer program medium," "computer usable medium," and "computer readable medium" are used to generally refer to media such as main memory 1706 and secondary memory 1712, removable storage drive 1716, a hard disk installed in hard disk drive 1714, and signals. These computer program products are means for providing software and/or image data to computer system 1700. The computer readable medium allows the computer system 1700 to read data, instructions, messages or message packets, and other computer readable information from the computer readable medium. The computer readable medium, for example, includes non-volatile memory, such as Floppy, ROM, flash memory, disk drive memory, CD-ROM, and other permanent storage. It is useful, for example, for transporting information, such as data and computer instructions, between computer systems 1700. Furthermore, the computer readable medium comprises computer readable information in a transitory state medium such as a network link and/or a network interface, including a wired network or a wireless network, that allow a computer to read such computer readable information.

Computer programs (also called computer control logic) are stored in main memory 1706 and/or secondary memory 1712. Computer programs are also received via communications interface 1724. Such computer programs, when executed, enable the computer system 1700 to perform the features of the present invention as discussed herein. In particular, the computer programs, when executed, enable the processor 1704 to perform the features of the computer system 1700. Accordingly, such computer programs represent controllers of the computer system 1700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

Figure 18:
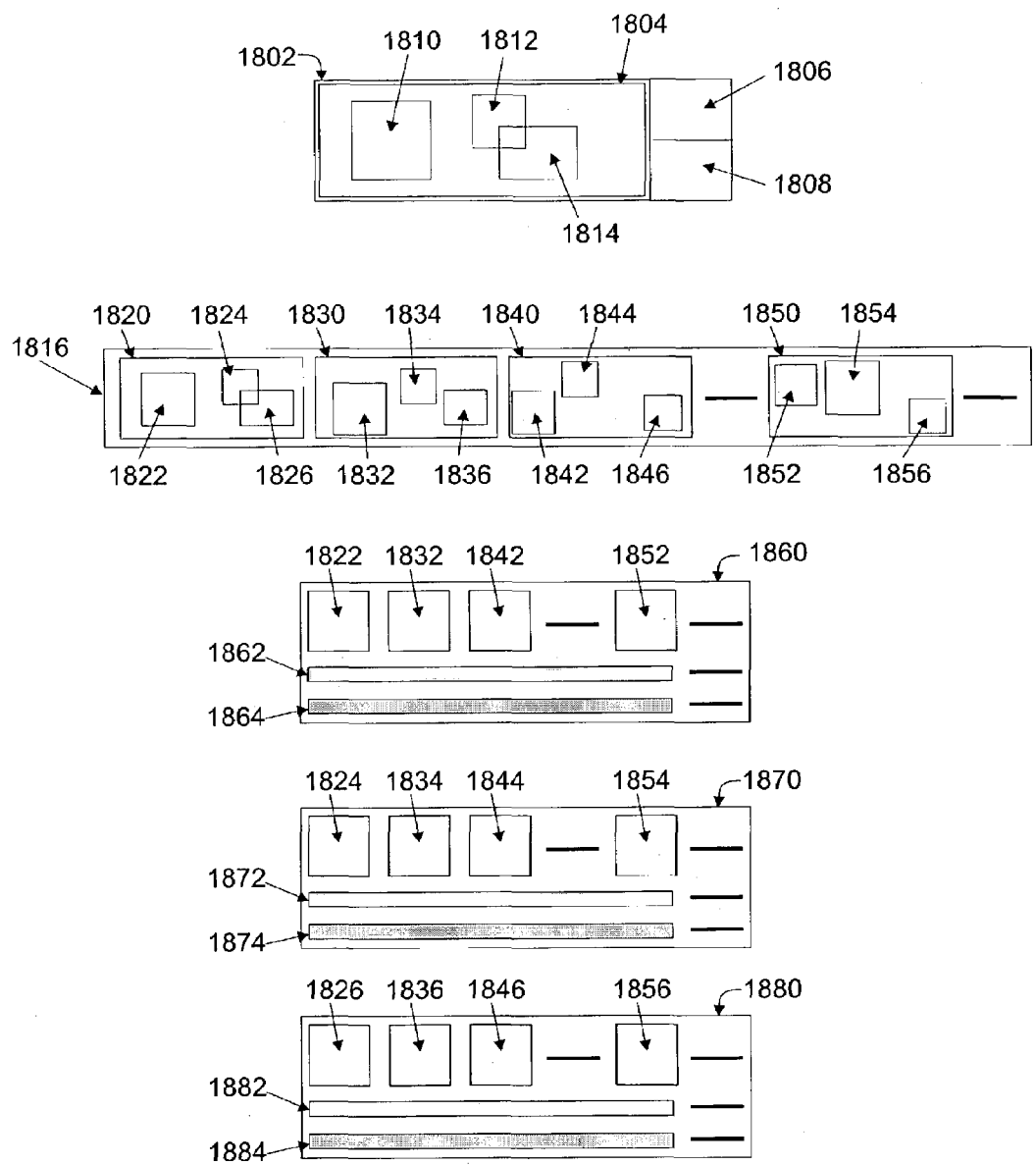
FIG. 18 illustrates a method by which movie sequences are created from panoramic/spherical image content and associated data.

Embedded Movie Streams Embodiment:

Camera systems designed according to the present invention capture significantly more visual information than is ordinarily viewed by an individual in a given instant in time. The same is true for other panoramic and spherical imaging systems. This advantageous feature facilitates the creation of multiple sequences from the same basic collection of streaming video frames. In essence, it is possible to create a plurality of video sequences ("movies") using different subsection views from different points-of-view taken from the collective whole and from optional accessory still images. This provides for multiple potential story lines or areas of concentrated viewing, all from the same 360° panoramic image data stream. FIG. 18 illustrates the process 1800 by which embedded movies are constructed. These processes are applicable to monoscopic or stereoscopic image data and their presentations.

A representative image data frame 1802 contains the visual information captured by a panoramic camera head at a given instant in time. The image data frame 1802 contains either solely image data, represented by region 1804, or image data plus additional data 1806 and 1808, such as time-based identification information and sequence-based identification information. The additional data 1806 and 1808 are either images, graphics, text, multimedia or other forms of data. Windows 1810, 1812, and 1814 are subsections of the complete panoramic or spherical image that contain a region of interest. These regions of interest are relevant to the story line, discussion, lecture, or discourse being conducted in relation to the visual content. Windows 1810, 1812, and 1814 may be different sizes with different levels of magnification, and the resultant image data content is made to fit a window matching the size of display being used.

The sequence of panoramic/spherical image data frames 1816 operates at a sufficient rate to provide motion image data for resultant movies. Image sequence 1816 contains image data frames 1820, 1830, 1840, 1850, and so on. Exemplary individual embedded movies 1860, 1870 and 1880 draw content from the full panoramic sequence 1816. Specifically, subsection view 1822 is the region of interest from frame 1820 for the story line of embedded movie 1860. This subsection view is arbitrarily selected and is used for illustrative purposes only.

Next, subsection view 1832 is drawn from frame 1830. Note that changing the location, size and magnification of the subsection view 1832 is equivalent to panning, tilting, and zooming with conventional cameras of limited FOV. Subsection view 1842 from frame 1840 follows, as does subsection view 1852 from frame 1850. By selecting the embedded movie views at the same rate as the source panoramic sequence 1816, a movie with focused interest is produced. An optional audio track 1862 contains scene-related audio, such as a dialogue or descriptions. A further optional audio track 1864 contains background audio. These may be mixed according to the control sequence established for embedded movie 1860.

Similarly, in embedded movie 1870, subsection views 1824, 1834, 1844, and 1854 are drawn respectively from panoramic frames 1820, 1830, 1840, and 1850. Scene-related audio 1872 and background audio 1874 tracks are mixed, as prescribed by the embedded movie sequence. The same process holds for embedded movie 1870 and its constituent components. Each of these embedded movies may be played through an appropriate playback device, such as the one described earlier, or a programmed computer system. Embedded movie control sequences include subsection view designation details as well as audio track designation details.

It should be apparent to those skilled in the art that this methodology carries significant flexibility. Individual embedded movies may carry visual content from anywhere in the panoramic/spherical image. Changes in position and magnification are readily accomplished to achieve the goals of the embedded movie's producer. Optional additional data 1806 and 1808 can be supplied and interleaved as needed to serve the producer's interests. Individual sound tracks are optionally alternate languages, and a single background audio track is optionally supplied to all movies as desired. With these capabilities, it is possible to create a number of different embedded movies with independent content of significant variation, all arising from the same comprehensive image data.

Conclusions:

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. An imaging system for producing wide-angle stereoscopic images, the system comprising:
   at least two optical sub-systems mounted so as to collectively capture a wide-angle field-of-view; and
   a stereoscopic display processing sub-system for processing overlapping images simultaneously from each optical sub-system;
   wherein each optical sub-system includes:
      a field-of-view which overlaps with a field-of-view of each adjacent optical sub-system;
      a first optical path with a first lens, a first lens-mounting structure and a first reflective element with a first reflective surface for directing an image in a first field-of-view to project on a first image sensor in the first optical path, wherein the first image sensor is mounted to a bottom side of a top capture board and the first reflective element has a first rear surface;
      a second optical path with a second lens, a second lens-mounting structure and a second reflective element with a second reflective surface for directing an image in a second field-of-view to project on a second image sensor in the second optical path, wherein the second image sensor is mounted on the top side of a bottom capture board and the second reflective element has a second rear surface;
   wherein the first rear surface and the second rear surface are positioned so that first rear surface and the second rear surface are facing each other in order for the first reflective surface of the first reflective element and the second reflective surface of the second reflective element to capture overlapping images derived from an image in the first field-of-view and an image in the second field-of-view on a common physical optical plane.

2. The imaging system of claim 1, wherein the wide-angle field-of-view is a portion of one of a panoramic field-of-view and spherical field-of-view.

3. The imaging system of claim 1, wherein the stereoscopic display processing sub-system further includes at least one display driver for providing at least one of multiple independent images simultaneously from at least one optical sub-system.

4. The imaging system of claim 3, wherein the stereoscopic display processing sub-system includes a point-of-view determinator to enable a user to select a direction for viewing the captured visual environment, the image data for which is taken from the imaging sub-systems.

5. The imaging system of claim 4, wherein the overlapping images which are selectable by the user include a field-of-view captured between the first optical path and the second optical path at an average interpupillary separation distance.

6. The imaging system of claim 4, wherein the overlapping images which are selectable by the user include a field-of-view captured between the first optical path and the second optical path at extrapupiliary separation distance, and wherein the stereoscopic display processing sub-system further includes an interpolation processor for normalizing the overlapping images to an average interpupillary separation distance.

7. The imaging system of claim 1, wherein the overlapping images represent separate superimposed right-eye and left-eye image datasets which are organized as individual continuous image datasets in memory from which subsets representing visual areas of interest are selected.

8. The imaging system of claim 4, wherein the point-of-view determinator is driven by at least one audio beam-steering circuit.

9. The imaging system of claim 1, wherein the stereoscopic display processing sub-system includes a distance determination process which calculates a distance of at least one object in the first field-of-view and the second field-of-view, the distance calculated by using triangulation of a first ray received from the object through the first optical path and a second ray received from the object in the second optical path.

10. The imaging system of claim 1, wherein the stereoscopic display processing sub-system includes processing images in at least one of a still image rate and a video image rate.

* * * * *